United States Patent
Watanabe et al.

(10) Patent No.: US 6,751,053 B2
(45) Date of Patent: Jun. 15, 2004

(54) THIN-FILM MAGNETIC HEAD RELIABLY PRODUCING FRINGING FLUX AT GAP LAYER AND METHOD FOR FABRICATING THE SAME

(75) Inventors: Toshinori Watanabe, Niigata-ken (JP); Kiyoshi Sato, Niigata-ken (JP); Kiyoshi Kobayashi, Niigata-ken (JP); Masaki Ikegami, deceased, late of Niigata-ken (JP), by Hiromi Ikegami, Chiaki Ikegami, legal representatives

(73) Assignee: Alps Electric Co., Ltd., Tokyo (JP)

( * ) Notice: Subject to any disclaimer, the term of this patent is extended or adjusted under 35 U.S.C. 154(b) by 330 days.

(21) Appl. No.: 09/822,119

(22) Filed: Mar. 30, 2001

(65) Prior Publication Data

US 2002/0071209 A1 Jun. 13, 2002

(Under 37 CFR 1.47)

(30) Foreign Application Priority Data

Apr. 3, 2000 (JP) .......................................... 2000-100348
Apr. 3, 2000 (JP) .......................................... 2000-100364

(51) Int. Cl.$^7$ ............................................... G11B 5/147
(52) U.S. Cl. ........................................................ 360/126
(58) Field of Search ................................ 360/126, 121, 360/125, 119, 317, 122, 319; 216/22, 38, 39, 52; 29/603.15, 603.16

(56) References Cited

U.S. PATENT DOCUMENTS

| | | |
|---|---|---|
| 5,452,164 A | 9/1995 | Cole et al. |
| 5,649,351 A | 7/1997 | Cole et al. |
| 5,652,687 A | 7/1997 | Chen et al. |
| 5,802,700 A | 9/1998 | Chen et al. |
| 6,033,580 A * | 3/2000 | Shouji et al. ................. 216/22 |
| 6,091,582 A * | 7/2000 | Komuro et al. ............. 360/126 |
| 6,278,579 B1 * | 8/2001 | Narumi et al. ............. 360/126 |
| 6,285,528 B1 * | 9/2001 | Akiyama et al. ........... 360/126 |
| 6,430,009 B1 * | 8/2002 | Komaki et al. ............. 360/319 |
| 6,490,129 B1 * | 12/2002 | Narumi et al. ............. 360/126 |
| 6,530,141 B2 * | 3/2003 | Komuro et al. ............. 360/126 |

FOREIGN PATENT DOCUMENTS

| | | |
|---|---|---|
| JP | 07-296328 | 11/1995 |
| JP | 08-339508 | 12/1996 |
| JP | 10-269523 | 10/1998 |
| JP | 11-7609 | 1/1999 |
| JP | 11-149620 | 6/1999 |
| JP | 11-312303 | 11/1999 |
| JP | 2000-105907 | 4/2000 |
| JP | 2001-236606 | 8/2001 |

* cited by examiner

*Primary Examiner*—Allen Cao
(74) *Attorney, Agent, or Firm*—Brinks Hofer Gilson & Lione

(57) ABSTRACT

A thin-film magnetic head includes a lower core layer, a gap layer, an upper pole layer, and an upper core layer. At the joint between the upper pole layer and the upper core layer, the width of the upper core layer is larger than the width of the upper pole layer, and also the inner end of the upper core layer is located at the back of the inner end of the upper pole layer. Alternatively, a thin-film magnetic head includes a lower core layer, a recording core, an upper core layer, a coil, and a magnetic intermediate layer. The magnetic intermediate layer has a higher saturation flux density than that of the upper core layer. Methods for fabricating thin-film magnetic heads are also disclosed.

26 Claims, 16 Drawing Sheets

SURFACE FACING RECORDING MEDIUM

THIN-FILM MAGNETIC HEAD RELIABLY PRODUCING FRINGING FLUX AT GAP LAYER AND METHOD FOR FABRICATING THE SAME

BACKGROUND OF THE INVENTION

1. Field of the Invention

The present invention relates to a thin-film magnetic write head used, for example, as a floating-type magnetic head. More particularly, the invention relates to a thin-film magnetic head in which fringing flux can be produced at an appropriate section in the periphery of a gap layer and which is suitable for an increased recording density and an increased recording frequency.

2. Description of the Related Art

FIG. 23 is a partial front view showing the structure of a conventional thin-film magnetic head (inductive head), and FIG. 24 is a sectional view taken along the line XXIV—XXIV of FIG. 23.

As shown in FIGS. 23 and 24, an insulating layer 9 is formed on a lower core layer 1 composed of a magnetic material, such as Permalloy.

The insulating layer 9 is provided with a trench 9a which extends in the height direction (in the Y direction in the drawing) from a surface facing a recording medium (hereinafter referred to as an "ABS") with the inner width being set to be a track width Tw.

In the trench 9a, a lower pole layer 3, a gap layer 4, and an upper pole layer 5 which is magnetically coupled to an upper core layer 6 are formed by plating in that order from the bottom.

As shown in FIG. 23, the upper core layer 6 is formed by plating over the upper pole layer 5.

As shown in FIG. 24, a coil layer Co is spirally formed by patterning on the insulating layer 9 at the back of the trench 9a formed in the insulating layer 9.

The coil layer Co is covered by a coil insulating layer 8 composed of a resist or the like, and the upper core layer 6 is formed on the coil insulating layer 8. A tip 6a of the upper core layer 6 is magnetically coupled to the upper pole layer 5 and a base 6b of the upper core layer 6 is magnetically coupled to the lower core layer 1.

In the inductive head shown in FIGS. 23 and 24, when a recording current is applied to the coil layer Co, a recording magnetic field is induced in the lower core layer 1 and the upper core layer 6, and magnetic signals are written into a recording medium, such as a hard disk, by a fringing magnetic field between the lower pole layer 3 which is magnetically coupled to the lower core layer 1, and the upper pole layer 5 which is magnetically coupled to the upper core layer 6.

In the inductive head shown in FIGS. 23 and 24, the lower pole layer 3, the gap layer 4, and the upper pole layer 5 are locally formed with the track width in the vicinity of the ABS, and an inductive head of this type is suitable for track narrowing.

A method for fabricating the inductive head shown in FIGS. 23 and 24 will be described. First, the insulating layer 9 is formed on the lower core layer 1, and the trench 9a having the track width Tw is formed in the insulating layer 9 for a predetermined length from the ABS in the height direction.

Next, in the trench 9a, the lower pole layer 3, the gap layer 4, and the upper pole layer 5 are continuously formed by plating, and then the coil layer Co is formed by patterning on the insulating layer 9 at the back of the trench 9a formed in the insulating layer 9.

The coil layer Co is covered by the coil insulating layer 8, and the upper core layer 6 is formed over the upper pole layer 5 and the coil insulating layer 8 by frame plating, and thus the inductive head shown in FIGS. 23 and 24 is obtained.

In the thin-film magnetic head shown in FIGS. 23 and 24, as described above, when a recording current is applied to the coil layer Co, a recording magnetic field is induced in the lower core layer 1 and the upper core layer 6, and magnetic flux flows into the lower pole layer 3 and the upper pole layer 5. Consequently, the upper pole layer 5 is magnetically saturated in the vicinity of the gap layer 4, resulting in a fringing flux, and magnetic recording is performed on the recording medium by the fringing flux.

However, in the inductive head shown in FIG. 24, at the joint between the upper pole layer 5 and the upper core layer 6, the inner end of the lower surface of the upper core layer 6 and the inner end of the upper surface of the upper pole layer 5 are located at the same position.

If the inner end of the upper core layer 6 and the inner end of the upper pole layer 5 are located at the same position at the joint between the upper pole layer 5 and the upper core layer 6, flux from the upper core layer 6 cannot be concentrated at the joint and it may not be possible for the flux to magnetically saturate the upper pole layer 5, resulting in a deterioration of the recording characteristics of the inductive head.

The depth T1 in the height direction of the joint between the gap layer 4 and the upper pole layer 5 is generally referred to as a gap depth (Gd), and in order to increase the fringing flux at the gap layer 4, the gap depth T1 must be decreased.

However, in the inductive head shown in FIG. 24, the gap depth T1 is equal to the length from the front surface at the ABS to the back surface in the height direction of the upper pole layer 5.

With respect to the structure of the thin-film magnetic head shown in FIGS. 23 and 24, since the width in the track width direction (in the X direction in the drawing) of the upper core layer 6 is larger than the width in the track width direction of the upper pole layer 5, which is equal to the track width Tw, the fringing magnetic field occurring between the upper core layer 6 and the upper pole layer 5 is wider than the track width Tw, and thus side fringing easily occurs.

In order to fabricate a thin-film magnetic head which is suitable for an increased recording density, in addition to the narrowing of the track width Tw, side fringing must be suppressed.

SUMMARY OF THE INVENTION

Accordingly, it is an object of the present invention to provide a thin-film magnetic head in which accurate magnetic recording can be performed by reliably producing fringing flux at a gap layer even if the track width is decreased.

It is another object of the present invention to provide a thin-film magnetic head in which, in particular, side fringing can be appropriately suppressed and also to provide a method for fabricating the same.

In one aspect of the present invention, a thin-film magnetic head includes a lower core layer; a gap layer formed on the lower core layer directly or with a lower pole layer therebetween, the lower pole layer having a smaller width in the track width direction than that of the lower core layer; an upper pole layer formed on the gap layer, the upper pole layer having a smaller width in the track width direction than that of the lower core layer; and an upper core layer joined to the upper pole layer. In the joint between the upper pole layer and the upper core layer, the width in the track width direction of the lower surface of the upper core layer is larger than the width in the track width direction of the upper surface of the upper pole layer, and also the inner end of the lower surface of the upper core layer is located at the back, in the height direction, of the inner end of the upper surface of the upper pole layer.

In this aspect of the present invention, at the joint between the upper pole layer and the upper core layer, flux from the upper core layer can be concentrated, and thus the upper pole layer can be reliably magnetically saturated by the flux. Therefore, recording characteristics of the thin-film magnetic head can be stabilized.

Since the flux flows satisfactorily from the upper core layer to the upper pole layer, high frequency recording characteristics of the thin-film magnetic head are also improved.

Preferably, the inner end of the lower surface of the upper core layer is 0.2 μm to 1.5 μm distant from the inner end of the upper surface of the upper pole layer in the height direction.

Preferably, the back surface of the upper pole layer is located towards the back, in the height direction, from the depth in the height direction (gap depth) of a magnetic gap, the magnetic gap being formed by joining the upper pole layer and the gap layer together.

For example, a Gd-setting insulating layer for determining the depth in the height direction (gap depth) of the magnetic gap is provided towards the back, in the height direction, and the contact surface between the upper pole layer and the Gd-setting insulating layer is located at the back, in the height direction, of the magnetic gap.

Preferably, the gap layer is composed of a nonmagnetic metallic material formable by plating.

More preferably, the nonmagnetic metallic material is at least one material selected from the group consisting of NiP, NiPd, NiW, NiMo, Au, Pt, Rh, Pd, Ru, and Cr.

In another aspect of the present invention, a thin-film magnetic head includes a lower core layer; a recording core formed on the lower core layer and exposed at a surface facing a recording medium, the recording core including either a lower pole layer, a gap layer, and an upper pole layer deposited in that order, or the gap layer and the upper pole layer deposited in that order; an upper core layer magnetically coupled to the upper pole layer of the recording core; a coil for inducing a recording magnetic field in the lower core layer, the recording core, and the upper core layer; and a magnetic intermediate layer formed between the upper pole layer and the upper core layer, the magnetic intermediate layer having a higher saturation flux density than that of the upper core layer.

As described above, in this aspect of the present invention, the magnetic intermediate layer having a higher saturation flux density than that of the upper core layer is interposed between the upper pole layer and the upper core layer.

Consequently, a recording magnetic field flows from the upper core layer into the upper pole layer through the magnetic intermediate layer. Since the saturation flux density of the magnetic intermediate layer is higher than that of the upper core layer, the recording magnetic field from the upper core layer flows into the upper pole layer after being concentrated in the magnetic intermediate layer, and side fringing does not easily occur in comparison with the conventional thin-film magnetic head. Moreover, it is possible to improve recording efficiency by providing the magnetic intermediate layer. As described above, in this aspect of the present invention, side fringing can be suppressed and recording efficiency can be appropriately improved, and thus it is possible to obtain a thin-film magnetic head which is suitable for an increased recording density.

Preferably, the width in the track width direction of the magnetic intermediate layer is smaller than the width in the track width direction of the upper core layer. Consequently, since it is possible to further concentrate a fringing magnetic field from the upper core layer in the vicinity of the gap, side fringing can be suppressed and also recording efficiency can be improved.

Preferably, the width in the track width direction of the magnetic intermediate layer is smaller than the width in the track width direction of the upper pole layer. Consequently, since it is possible to further concentrate a fringing magnetic field from the upper core layer in the vicinity of the gap, side fringing can be suppressed and also recording efficiency can be improved.

In the structure described above, the front surface at the recording medium side of the magnetic intermediate layer may be exposed at the surface facing the recording medium. Since the width in the track width direction of the magnetic intermediate layer is smaller than the width in the track width direction of the upper pole layer, even if the magnetic intermediate layer is exposed at the surface facing the recording medium, the recording magnetic field is appropriately concentrated in the vicinity of the gap, and thus side fringing does not increase and also recording efficiency is not degraded.

Preferably, the front surface at the recording medium side of the magnetic intermediate layer recedes in the height direction from the surface facing the recording medium.

By making the front surface of the magnetic intermediate layer recede from the surface facing the recording medium in the height direction, even if the width in the track width direction of the magnetic intermediate layer is larger than the width in the track width direction of the upper pole layer and a portion of the fringing magnetic field produced between the magnetic intermediate layer and the upper pole layer occurs slightly wider than the track width Tw, the fringing magnetic field is not detected as side fringing, and thus it is possible to more appropriately suppress side fringing.

Preferably, the front surface at the recording medium side of the upper core layer recedes in the height direction from the surface facing the recording medium. Consequently, the recording magnetic field can be more appropriately concentrated in the vicinity of the gap, and thus side fringing can be effectively suppressed.

Preferably, the saturation flux density of the magnetic intermediate layer is 1.3 T or more. More preferably, the magnetic intermediate layer is composed of FeNi, where the Fe content is 40 to 90% by mass and the balance is the Ni content. Such a magnetic material has a saturation flux density of 1.3 T or more.

In another aspect of the present invention, a method for fabricating a thin-film magnetic head includes:

a step (a) of forming a recording core on a lower core layer, the recording core including either a lower pole layer, a gap layer, and an upper pole layer deposited in that order, wherein the layers define the widths in the track width direction of the lower pole layer and the upper pole layer, at a surface facing a recording medium; or a gap layer and an upper pole layer deposited in that order, wherein the layers define the width in the track width direction of the upper pole layer at a surface facing a recording medium;

a step (b) of forming an insulating layer in the periphery of the recording core prior to or subsequent to the step (a) so that the upper surface of the recording core and the upper surface of the insulating layer are at the same level;

a step (c) of forming a magnetic material layer having a higher saturation flux density than that of an upper core layer on the recording core and the insulating layer;

a step (d) of forming a resist layer with a predetermined size on the magnetic material layer so as to cover at least a portion of the magnetic material layer formed on the recording core;

a step (e) of removing the magnetic material layer in the portion not covered by the resist layer so as to form a magnetic intermediate layer from the remaining magnetic material layer; and a step (f) of removing the resist layer on the magnetic intermediate layer and forming the upper core layer on the magnetic intermediate layer by patterning.

Alternatively, in another aspect of the present invention, a method for fabricating a thin-film magnetic head includes:

a step (a) of forming a recording core on a lower core layer, the recording core including either a lower pole layer, a gap layer, and an upper pole layer deposited in that order, wherein the layers define the widths in the track width direction of the lower pole layer and the upper pole layer, at a surface facing a recording medium; or a gap layer and an upper pole layer deposited in that order, wherein the layers define the width in the track width direction of the upper pole layer at a surface facing a recording medium;

a step (b) of forming an insulating layer in the periphery of the recording core prior to or subsequent to the step (a) so that the upper surface of the recording core and the upper surface of the insulating layer are at the same level;

a step (g) of forming a resist layer on the recording core and the insulating layer, and making a pattern for forming a magnetic intermediate layer in the resist layer so that at least a portion of the recording core is exposed in the pattern;

a step (h) of forming the magnetic intermediate layer in the pattern, the magnetic intermediate layer having a larger saturation flux density than that of an upper core layer;

a step (i) of removing the resist layer; and a step (j) of forming the upper core layer on the magnetic intermediate layer by patterning.

In accordance with either one of the fabrication methods described above, it is possible to appropriately form the magnetic intermediate layer with a high degree of consistency. Additionally, by interposing the magnetic intermediate layer between the upper pole layer and the upper core layer, it is possible to obtain satisfactory magnetic coupling between the upper pole layer and the upper core layer.

Preferably, the width in the track width direction of the resist layer in the step (d) or the width in the track width direction of the pattern in the step (g) is smaller than the width in the track width direction of the upper core layer so that the width in the track width direction of the magnetic intermediate layer is smaller than the width in the track width direction of the upper core layer.

As described above, in the present invention, the pattern of the resist layer can be set at a predetermined size, and in the case described above, the width in the track width direction of the magnetic intermediate layer can be set smaller than the width in the track width direction of the upper core layer. Consequently, a recording magnetic field can be concentrated in the vicinity of the gap, and it is possible to obtain a thin-film magnetic head in which side fringing can be more appropriately suppressed.

Preferably, the width in the track width direction of the resist layer in the step (d) or the width in the track width direction of the pattern in the step (g) is smaller than the width in the track width direction of the upper pole layer so that the width in the track width direction of the magnetic intermediate layer is smaller than the width in the track width direction of the upper pole layer.

As described above, in the present invention, the width in the track width direction of the magnetic intermediate layer can be set smaller than the width in the track width direction of the upper pole layer. Consequently, the recording magnetic field can be further concentrated in the vicinity of the gap, and it is possible to obtain a thin-film magnetic head in which side fringing can be more appropriately suppressed.

In the structure described above, more preferably, the front surface at the recording medium side of the resist layer in the step (d) or the front surface at the recording medium side of the pattern in the step (g) is formed along the surface facing the recording medium so that the front surface at the recording medium side of the magnetic intermediate layer is exposed at the surface facing the recording medium.

Preferably, the front surface at the recording medium side of the resist layer in the step (d) or the front surface at the recording medium side of the pattern in the step (g) recedes in the height direction from the surface facing the recording medium so that the front surface at the recording medium side of the magnetic intermediate layer recedes in the height direction from the surface facing the recording medium. Consequently, even if a portion of a fringing magnetic field produced between the magnetic intermediate layer and the upper pole layer has a larger width than the track width Tw, side fringing does not easily occur.

Preferably, in the step (f) or in the step (j), the front surface at the recording medium side of the upper core layer recedes in the height direction from the surface facing the recording medium. Consequently, the recording magnetic field can be more effectively concentrated in the vicinity of the gap, and side fringing can be appropriately suppressed.

Preferably, the magnetic intermediate layer is composed of FeNi, where the Fe content is 40 to 90% by mass and the balance is the Ni content.

DESCRIPTION OF THE PREFERRED EMBODIMENTS

Figure 1:
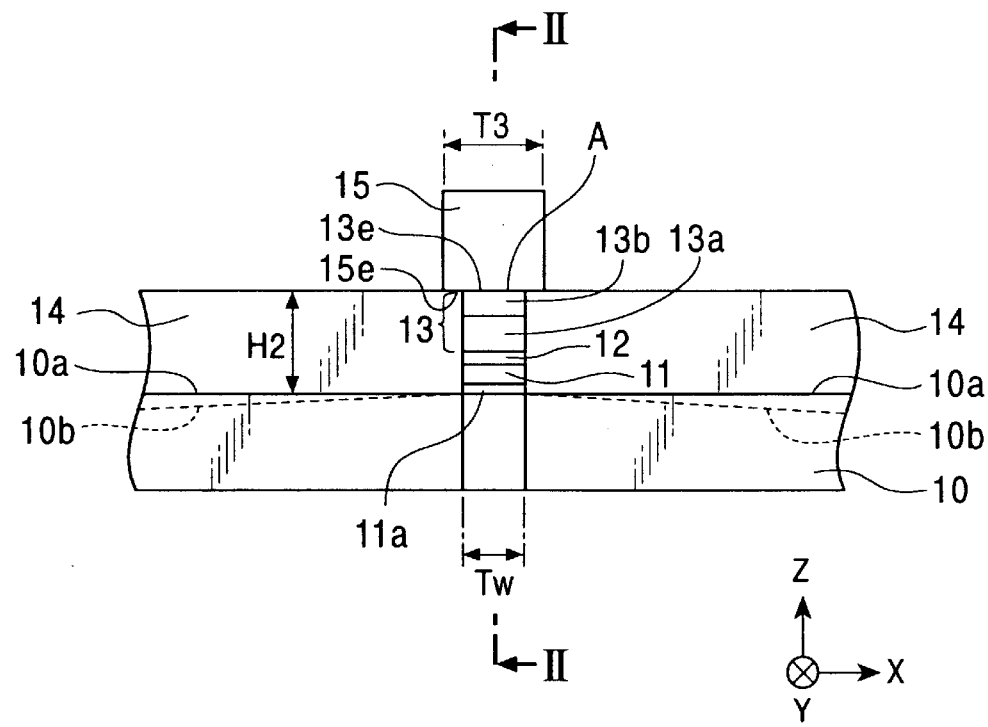
FIG. 1 is a partial front view of a thin-film magnetic head in a first embodiment of the present invention.
Figure 2:
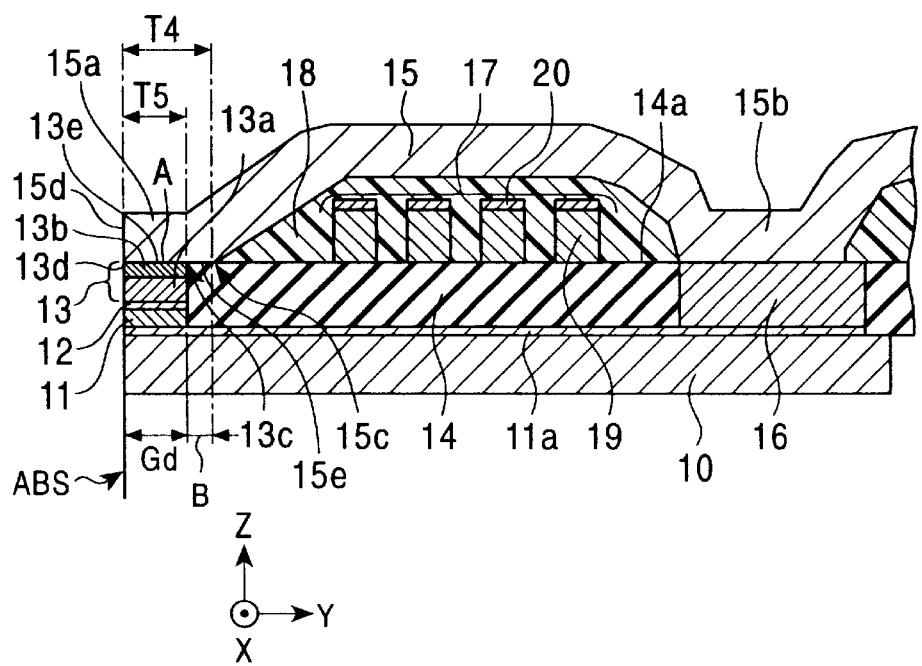
FIG. 2 is a partial sectional view taken along the line II—II of FIG. 1.

FIG. 1 is a partial front view of a thin-film magnetic head in a first embodiment of the present invention, and FIG. 2 is a partial sectional view taken along the line II—II of FIG. 1.

The thin-film magnetic head shown in FIG. 1 is an inductive head for writing. In the present invention, a read head (MR head) using a magnetoresistive effect may be deposited on the lower surface of the inductive head.

A lower core layer 10 shown in FIGS. 1 and 2 is composed of a magnetic material, such as Permalloy. Additionally, when a read head is deposited on the lower surface of the lower core layer 10, a shielding layer for protecting a magnetoresistive element from noise may be provided independently. Alternatively, without providing the shielding layer, the lower core layer 10 may be also used as an upper shielding layer of the read head.

As shown in FIG. 1, the upper surfaces of the lower core layer 10 extending from the base of a lower pole layer 11, which will be described below, are flat planes 10a shown by the solid line. However, inclined planes 10b, shown by the dotted line, which incline toward a direction opposite to an upper core layer 15 may be formed. By forming the inclined planes 10b in the upper surface of the lower core layer 10, side fringing can be suppressed more appropriately.

As shown in FIG. 1, a plating underlayer 11a is formed using a magnetic metallic material on the lower core layer 10, and a lower pole layer 11, a gap layer 12, and an upper pole layer 13 are further deposited thereon in that order.

As shown in FIGS. 1 and 2, the lower pole layer 11 is formed by plating on the lower core layer 10 with the plating underlayer 11a therebetween. The lower pole layer 11 is magnetically coupled to the lower core layer 10, and the material for the lower pole layer 11 may be the same as or different from the material for the lower core layer 10. The lower pole layer 11 may be composed of either a single-layered film or a multi-layered film. The width in the track width direction of the lower pole layer 11 is smaller than that of the lower core layer 10.

The gap layer 12 which is nonmagnetic is deposited on the lower pole layer 11.

In the present invention, preferably, the gap layer 12 is composed of a nonmagnetic metallic material and is formed by plating on the lower pole layer 11.

The nonmagnetic metallic material is preferably at least one material selected from the group consisting of NiP, NiPd, NiW, NiMo, NiRh, Au, Pt, Rh, Pd, Ru, and Cr. The gap layer 12 may be composed of either a single-layered film or a multi-layered film.

The upper pole layer 13 magnetically coupled to the upper core layer 15, which will be described below, is formed by plating on the gap layer 12. Additionally, the material for the upper pole layer 13 may be the same as or different from the material for the upper core layer 15.

When the gap layer 12 is composed of the nonmagnetic metallic material as described above, it is possible to form the lower pole layer 11, the gap layer 12, and the upper pole layer 13 continuously by plating.

Additionally, in the present invention, the gap layer 12 may be formed directly on the lower core layer 10 without providing the lower pole layer 11 which is connected to the lower core layer 10. However, in order to more appropriately suppress side fringing, preferably, the lower pole layer 11 is formed on the lower core layer 10 at a thickness of at least approximately 0.3 µm.

As described above, the materials for the lower pole layer 11 and the upper pole layer 13 may be the same as or different from the materials for the core layers to which the pole layers are magnetically coupled. However, in order to improve the recording density, preferably, the lower pole layer 11 and the upper pole layer 13 which are opposed to each other with the gap layer 12 therebetween have higher saturation flux densities than those of the lower core layer 10 and the upper core layer 15, respectively. When the lower pole layer 11 and the upper pole layer 13 have high saturation flux densities as described above, it is possible to concentrate a recording magnetic field in the vicinity of the gap, thus improving the recording density.

Additionally, as shown in FIGS. 1 and 2, the upper pole layer 13 is a two-layered film including a first upper pole layer 13a and a second upper pole layer 13b. The first upper pole layer 13a is composed of a magnetic material which has a larger saturation flux density than that of the second upper pole layer 13b. In this way, if the upper pole layer 13 is composed of a multi-layered film in which the saturation flux density increases toward the gap layer 12, it is possible to easily concentrate the flux from the upper core layer 15 in the vicinity of the gap, thus improving the recording density.

The upper pole layer 13 may be single-layered or, alternatively, the upper pole layer 13 may be a multi-layered film including three or more layers.

In the thin-film magnetic head shown in FIGS. 1 and 2, the width of the upper pole layer 13 is set to be smaller than the width of the lower core layer 10, and the width of the upper pole layer 13 defines a track width Tw.

The track width Tw is preferably 0.7 µm or less, and more preferably 0.4 µm or less. The size corresponds to a value that is below the lower limit of resolution when resist is exposed and developed.

As shown in FIG. 1, a height H2 represents the total thickness of the lower pole layer 11, the gap layer 12, and the upper pole layer 13. For example, the lower pole layer 11 has a thickness of approximately 0.4 µm, the gap layer 12 has a thickness of approximately 0.2 µm, and the upper pole layer 13 has a thickness of approximately 2 µm.

As shown in FIG. 1, in the joint A between the upper pole layer 13 and the upper core layer 15, the width T3 in the track width direction (in the X direction in the drawing) of a lower surface 15e of the upper core layer 15 is larger than the width Tw in the track width direction of an upper surface 13e of the upper pole layer 13.

As shown in FIG. 2, in the joint A between the upper pole layer 13 and the upper core layer 15, an inner end 15c of the lower surface 15e of the upper core layer 15 is located at the back, in the height direction, of an inner end 13c of the upper surface 13e of the upper pole layer 13. The inner end 15c of the lower surface 15e of the upper core layer 15 is separated from the inner end 13c of the upper surface 13e of the upper pole layer 13 by 0.2 µm to 1.5 µm in the height direction. In FIG. 2, symbol B represents the distance between the inner end 15c of the upper core layer 15 and the inner end 13c of the upper pole layer 13.

The flux from the upper core layer 15 can be concentrated at the joint A between the upper pole layer 13 and the upper core layer 15, and the upper pole layer 13 can be reliably magnetically saturated by the flux. Consequently, recording characteristics of the thin-film magnetic head can be stabilized.

Additionally, since the flux flows from the upper core layer 15 to the upper pole layer 13 satisfactorily, high frequency recording characteristics of the thin-film magnetic head are also improved.

As shown in FIGS. 1 and 2, a front surface 13d of the upper pole layer 13 and a front surface 15d of the upper core layer 15 are exposed at a surface facing a recording medium (ABS). However, the front surface 15d of the upper core layer 15 may recede from the ABS in the height direction.

In FIG. 2, in the joint A between the upper pole layer 13 and the upper core layer 15, a length T4 in the height direction of the upper core layer 15 is greater than a length T5 in the height direction of the upper pole layer 13.

In such a case, the depth in the height direction (gap depth Gd) of a magnetic gap, which is formed by joining the gap layer 12, which has the same length as that of the length T5 of the upper pole layer 13, and the upper pole layer 13 together, can be set to be relatively short, and thus it is possible to increase the fringing magnetic flux at the gap layer 12.

Next, as shown in FIG. 2, an underlying insulating layer 14 is formed in contact with the back surfaces of the lower pole layer 11, the gap layer 12, and the upper pole layer 13. The surface of the underlying insulating layer 14 is level with the joint A between the upper pole layer 13 and the upper core layer 15. The underlying insulating layer 14 is an inorganic insulating layer composed of an inorganic material. Preferably, the inorganic material is at least one material selected from the group consisting of $Al_2O_3$, $SiO_2$, $Ta_2O_5$, and AlN.

A coil layer 17 composed of Cu or the like, which is spirally formed by patterning, is formed on the underlying insulating layer 14 for inducing a recording magnetic field in the upper core layer 15 and the lower core layer 10.

A coil insulating layer 18 composed of an organic material, such as a resist or a polyimide, is formed on the coil layer 17, and the upper core layer 15 composed of a magnetic material, such as Permalloy, is formed over the coil insulating layer 18 by frame plating or the like.

A tip 15a of the upper core layer 15 is in contact with the upper pole layer 13, and a base 15b of the upper core layer 15 is magnetically coupled to an elevating layer (back gap layer) 16 composed of a magnetic material formed on the lower core layer 10.

In the thin-film magnetic head shown in FIG. 2, the elevating layer 16 is composed of the same material as that of the lower core layer 10 or the upper core layer 15. Additionally, the elevating layer 16 may be a single-layered film or a multi-layered film composed of a metallic magnetic material that is different from the material for the lower core layer 10 or the upper core layer 15.

Additionally, the elevating layer 16 may not be provided. In such a case, the base 15b of the upper core layer 15 extends to the lower core layer 10 and is magnetically coupled to the lower core layer 10 directly.

As shown in FIG. 2, in the present invention, preferably, the coil layer 17 includes a conductive material layer 19 composed of Cu or the like and a conductive protective layer 20 composed of Ni or the like deposited thereon.

If the conductive material layer 19 is formed using Cu, the coil resistance can be decreased, and the allowable current can be increased. Additionally, the material for the conductive material layer 19 is not limited to Cu, and the conductive material layer 19 may have a single-layered structure or a multi-layered structure containing either one of Cu and Au or both.

The material for the conductive protective layer 20 is not limited to Ni, and the conductive protective layer 20 may be a conductive layer with a single-layered structure or a multi-layered structure containing at least one element selected from the group consisting of Ni, P, Pd, Pt, B, Au, and W, having superior oxidation resistance.

As shown in FIG. 2, the coil insulating layer 18 is formed on the coil layer 17. The upper surface of the coil layer 17 may be exposed to air until the coil insulating layer 18 is formed. In such a case, if the coil layer 17 is composed of a single conductive material layer 19 formed of Cu or the like, the surface of the conductive material layer 19 is oxidized, and for example, adhesion with the coil insulating layer 18 shown in FIG. 2 is degraded, resulting in the separation of the layers.

Moreover, the formation of the oxidized layer makes the coil resistance of the inductive head unstable, resulting in a deterioration of the recording characteristics.

Therefore, in the present invention, by providing the conductive protective layer 20 composed of Ni or the like for preventing the oxidation of the conductive material layer 19, it is possible to appropriately prevent the conductive material layer 19 from being oxidized when the coil insulating layer 18 is formed.

Additionally, preferably, the conductive protective layer 20 has a thickness of approximately 0.5 μm. The conductive protective layer 20 composed of Ni or the like may be oxidized if exposed to air. When the conductive protective layer 20 is, for example, composed of Ni, since the oxidized layer formed in the conductive protective layer 20 has a thickness of approximately 3.0 nm, if the conductive protective layer 20 is formed at a thickness of approximately 200 to 600 nm, even if the oxidized layer is removed by ion milling or the like, the conductive material layer 19 is not directly influenced by the ion milling processing, and thus it is possible to prevent a change in the cross section of the conductive material layer 19.

Preferably, the conductive material layer 19 and the conductive protective layer 20 are continuously formed by plating. Additionally, in the present invention, instead of the conductive protective layer 20, a protective layer composed of a nonconductive insulating material, such as $SiO_2$, may be provided. The protective layer may be formed by sputtering.

In FIG. 2, although the coil layer 17 is formed on a surface 14a of the underlying insulating layer 14, the coil layer 17 may be embedded in the underlying insulating layer 14.

Figure 3:
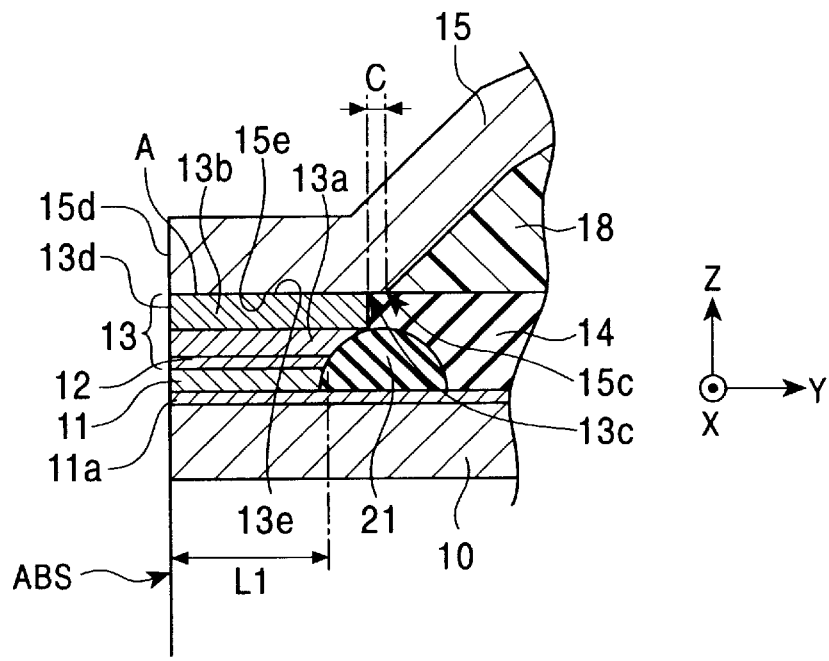
FIG. 3 is a partial sectional view of a thin-film magnetic head in the vicinity of the ABS in a second embodiment of the present invention.

FIG. 3 is an enlarged partial sectional view of a thin-film magnetic head in the vicinity of the ABS in a second embodiment of the present invention.

In the thin-film magnetic head shown in FIG. 3, in the same manner as that in the thin-film magnetic head shown in FIG. 1, in the joint A between an upper pole layer 13 and an upper core layer 15, the width in the track width direction (in the X direction in the drawing) of the lower surface of the upper core layer 15 is larger than the width in the track width direction of the upper pole layer 13.

As shown in FIG. 3, in the joint A between the upper pole layer 13 and the upper core layer 15, an inner end 15c of a lower surface 15e of the upper core layer 15 is located at the back of an inner end 13c of an upper surface 13e of the upper pole layer 13 in the height direction (in the Y direction in the drawing).

The inner end 15c of the lower surface 15e of the upper core layer 15 is separated from the inner end 13c of the upper surface 13e of the upper pole layer 13 by 0.2 μm to 1.5 μm in the height direction. In FIG. 3, symbol C represents the distance between the inner end 15c of the upper core layer 15 and the inner end 13c of the upper pole layer 13.

Consequently, flux from the upper core layer 15 can be concentrated in the joint A between the upper pole layer 13 and the upper core layer 15, and thus the upper pole layer 13 can be reliably magnetically saturated by the flux. Therefore, recording characteristics of the thin-film magnetic head can be stabilized.

Since the flux flows satisfactorily from the upper core layer 15 to the upper pole layer 13, high frequency recording characteristics of the thin-film magnetic head are also improved.

Furthermore, in the thin-film magnetic head shown in FIG. 3, a Gd-setting insulating layer 21 composed of an insulating material, such as a resist, is formed at the back of a lower pole layer 11, a gap layer 12, and the upper pole layer 13. The Gd-setting insulating layer 21 determines a depth in the height direction (gap depth) of a magnetic gap formed by joining the gap layer 12 and the upper pole layer 13 together.

In the Gd-setting insulating layer 21, the front surface at the recording medium side (the ABS side) is a curved surface in which the distance from the ABS gradually increases from a lower core layer 10 upward (in the Z direction in the drawing). That is, as the front surface of the Gd-setting insulating layer 21 ascends toward the upper core layer 15 (in the Z direction), the distance between the front surface of the Gd-setting insulating layer 21 to the ABS increases. The depth of the contact surface between the upper pole layer 13 and the Gd-setting insulating layer 21 gradually deepens in the height direction from the gap depth as the contact surface ascends toward the upper core layer 15.

The gap depth is defined as L1 by the front surface of the Gd-setting insulating layer 21.

In order to increase the fringing flux in the periphery of the gap layer 12, the area of the gap layer 12 is desirably as small as possible. However, in the thin-film magnetic head shown in FIGS. 1 and 2, if the area of the gap layer 12 is greatly decreased, the volume of the upper pole layer 13 becomes too small, and the flux from the upper core layer 15 may be concentrated more than it needs to be, and thus the flux may be saturated before it reaches the vicinity of the gap layer 12.

In the thin-film magnetic head shown in FIG. 3, the length of the upper pole layer 13 can be set longer than that of the gap layer 12 or the lower pole layer 11, and thus it is possible to increase the volume of the upper pole layer 13 without increasing the area of the gap layer 12.

As shown in FIG. 3, the back end in the height direction (in the Y direction) of the upper pole layer 13 extends over the curved surface of the Gd-setting insulating layer 21. That is, the joint area between the upper pole layer 13 and the upper core layer 15 magnetically coupled to the upper pole layer 13 is greater than the value obtained by multiplying the gap depth by the track width Tw. The joint area is greater than that of the thin-film magnetic head shown in FIGS. 1 and 2 in which the length T5 in the height direction of the upper pole layer 5 is substantially equal to the gap depth, and thus the volume of the upper pole layer 13 can also be increased.

Consequently, it is possible to prevent the flux flowing from the upper core layer 15 from being excessively concentrated at the joint, and the amount of flux flowing through the upper pole layer 13 can be appropriately adjusted.

For example, the Gd-setting insulating layer 21 is formed by a method in which, after a resist layer composed of an ultraviolet-curing resin is formed into a rectangular shape, post baking (heat treatment) is performed to sag the resist layer so that a curved surface, in which the distance from the ABS gradually increases from the lower core layer 10 in the Z direction, is formed in the front surface of the Gd-setting insulating layer 21, and then the Gd-setting insulating layer 21 is cured by ultraviolet radiation.

In FIG. 3, a front surface 13d of the upper pole layer 13 and a front surface 15d of the upper core layer 15 are also exposed at the ABS. However, the front surface 15d of the upper core layer 15 may recede in the height direction from the ABS.

Figure 4:
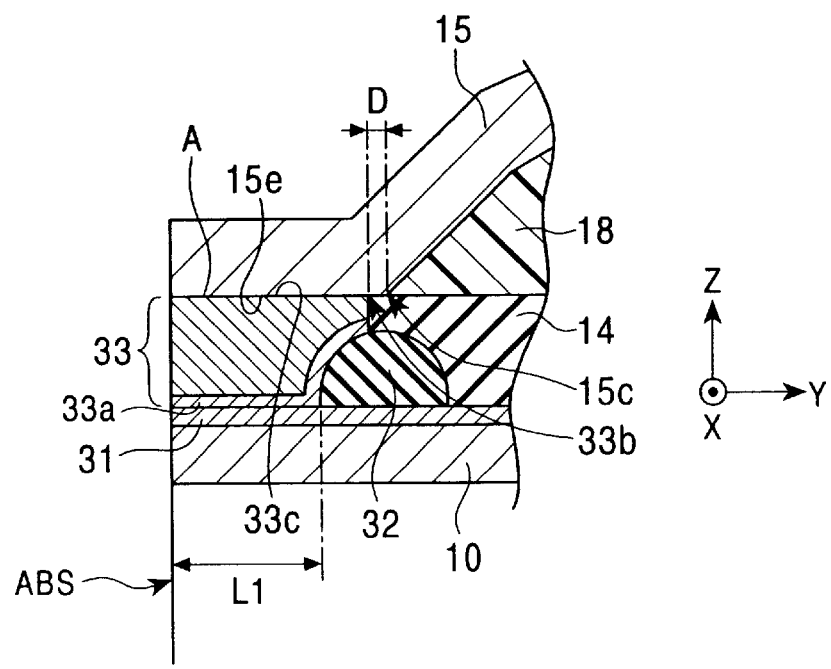
FIG. 4 is a partial sectional view of a thin-film magnetic head in the vicinity of the ABS in a third embodiment of the present invention.

FIG. 4 is a partial sectional view of a thin-film magnetic head in a third embodiment of the present invention. In the thin-film magnetic head shown in FIG. 4, in the same manner as that in the thin-film magnetic head shown in FIG. 1, in the joint A between an upper pole layer 33 and an upper core layer 15, the width in the track width direction (in the X direction in the drawing) of a lower surface 15e of the upper core layer 15 is larger than the width in the track width direction of an upper surface 33c of the upper pole layer 33.

As shown in FIG. 4, in the joint A between the upper pole layer 33 and the upper core layer 15, an inner end 15c of the lower surface 15e of the upper core layer 15 is located at the back of an inner end 33b of the upper surface 33c of the upper pole layer 33 in the height direction (in the Y direction in the drawing). The inner end 15c of the lower surface 15e of the upper core layer 15 is separated from the inner end 33b of the upper surface 33c of the upper pole layer 33 in the height direction by 0.2 μm to 1.5 μm. In FIG. 4, symbol D represents the distance between the inner end 15c of the upper core layer 15 and the inner end 33b of the upper pole layer 33.

Consequently, flux from the upper core layer 15 can be concentrated in the joint A between the upper pole layer 33 and the upper core layer 15, and thus the upper pole layer 33 can be reliable magnetically saturated by the flux. Therefore, recording characteristics of the thin-film magnetic head can be stabilized.

Since the flux flows satisfactorily from the upper core layer 15 to the upper pole layer 33, high frequency recording characteristics of the thin-film magnetic head are also improved.

In this embodiment, a gap layer 31 is directly deposited on a lower core layer 10. The gap layer 31 is composed of an insulating material, such as $Al_2O_3$ or $SiO_2$. A Gd-setting insulating layer 32 is formed at a predetermined position from the ABS on the gap layer 31. The gap depth is set by the front surface at the ABS side of the Gd-setting insulating layer 32 which determines the back end in the height direction of the joint between the gap layer 31 and the upper pole layer 33. In FIG. 4, the gap depth is set at L1.

The upper pole layer 33 is formed by plating on the front surface of the Gd-setting insulating layer 32 and on the gap layer 31 between the Gd-setting insulating layer 32 and the ABS with a plating underlayer 33a therebetween.

The upper surface of the upper pole layer 33 is magnetically coupled to the upper core layer 15.

In the Gd-setting insulating layer 32, the front surface at the recording medium side (the ABS side) is a curved surface in which the distance from the ABS gradually increases from the lower core layer 10 upward (in the Z direction in the drawing). The depth of the contact surface between the upper pole layer 33 and the Gd-setting insulating layer 32 is gradually increased from the gap depth in the height direction toward the upper core layer 15.

Consequently, in the thin-film magnetic head shown in FIG. 4, the length of the upper pole layer 33 can be set longer than the gap depth L1, and thus the volume of the upper pole layer 33 can be increased without increasing the area of the magnetic gap.

That is, it is possible to prevent the flux flowing from the upper core layer 15 from being excessively concentrated at the joint, and the amount of flux flowing through the upper pole layer 33 can be appropriately adjusted.

The thin-film magnetic head in this embodiment differs from the thin-film magnetic heads shown in FIGS. 1 to 3 in that the gap layer 31 and the upper pole layer 33 are not continuously plated.

However, as shown in FIG. 4, if the plating underlayer 33a is formed on the front surface of the Gd-setting insulating layer 32 and on the gap layer 31 between the Gd-setting insulating layer 32 and the ABS, irregular reflection easily occurs due to the presence of the plating underlayer 33a when a resist layer used for forming the upper pole layer 33 by patterning is formed on the plating underlayer 33a and the resist layer is exposed and developed in the shape of the upper pole layer 33. Due to the irregular reflection, it is difficult to form the upper pole layer 33 with satisfactory pattern accuracy. Consequently, in view of pattern accuracy, preferred is a thin-film magnetic head in which the plating underlayer 11a is formed on the lower core layer 10 as in the thin-magnetic heads shown in FIGS. 1 to 3, and after the Gd-setting insulating layer 21 is deposited thereon, the lower pole layer 11, the gap layer 12, and the upper pole layer 13 are formed by continuous plating.

Figure 5:
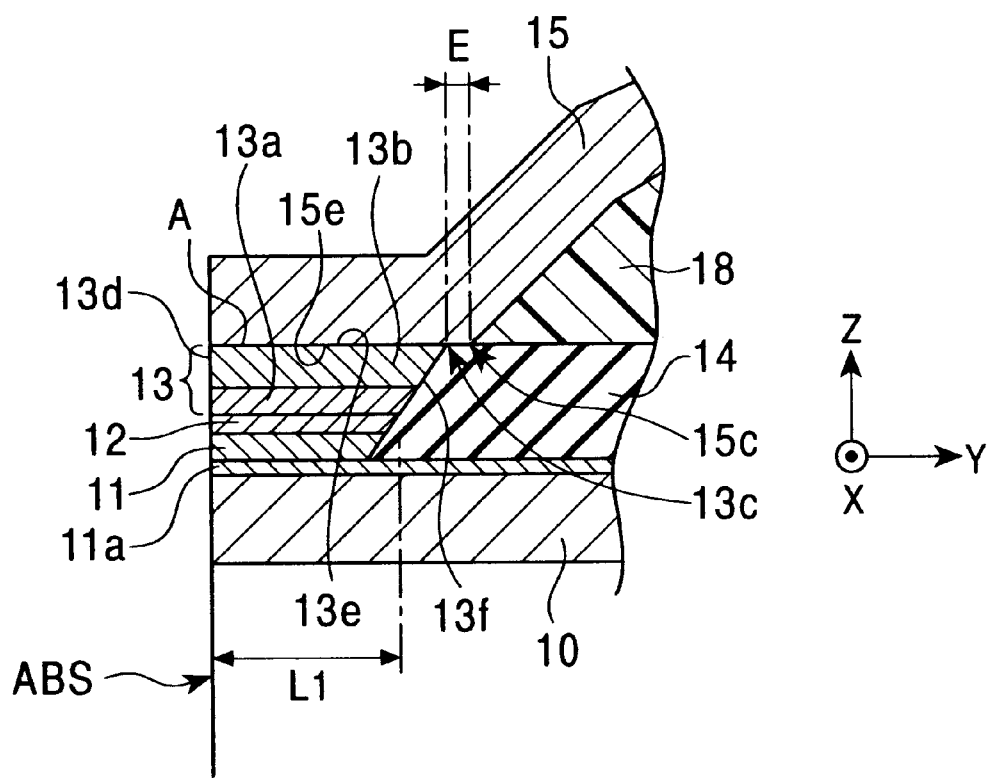
FIG. 5 is a partial sectional view of a thin-film magnetic head in the vicinity of the ABS in a fourth embodiment of the present invention.

FIG. 5 is a partial sectional view of a thin-film magnetic head in a fourth embodiment of the present invention.

In the thin-film magnetic head shown in FIG. 5, in the same manner as that in the thin-film magnetic head shown in FIG. 1, in the joint A between an upper pole layer 13 and an upper core layer 15, the width in the track width direction (in the X direction) of a lower surface 15e of the upper core layer 15 is larger than the width in the track width direction of an upper surface 13e of the upper pole layer 13.

As shown in FIG. 5, in the joint A between the upper pole layer 13 and the upper core layer 15, an inner end 15c of the lower surface 15e of the upper core layer 15 is located at the back of an inner end 13c of the upper surface 13e of the upper pole layer 13 in the height direction (in the Y direction).

The inner end 15c of the lower surface 15e of the upper core layer 15 is separated from the inner end 13c of the upper surface 13e of the upper pole layer 13 in the height direction by 0.2 μm to 1.5 μm. In FIG. 5, symbol E represents the distance between the inner end 15c of the upper core layer 15 and the inner end 13c of the upper pole layer 13.

Consequently, flux from the upper core layer 15 can be concentrated in the joint A between the upper pole layer 13 and the upper core layer 15, and thus the upper pole layer 13 can be reliably magnetically saturated by the flux. Therefore, recording characteristics of the thin-film magnetic head can be stabilized.

Since the flux flows satisfactorily from the upper core layer 15 to the upper pole layer 13, high frequency recording characteristics of the thin-film magnetic head are also improved.

In the thin-film magnetic head shown in FIG. 5, the end at the ABS side of an underlying insulating layer 14, which is in contact with the back ends of the lower pole layer 11, the gap layer 12, and the upper pole layer 13, is an inclined surface in which the depth increases toward the upper core layer 15.

Consequently, a back end 13f of the upper pole layer 13 is located towards the back, in the height direction, from the depth (gap depth) in the height direction of a magnetic gap formed by joining the gap layer 12 and the upper pole layer 13 together. Additionally, the gap depth is determined as L1 by the front surface of the underlying insulating layer 14 as a Gd-setting insulating layer.

In the thin-film magnetic head shown in FIG. 5, the length of the upper surface of the upper pole layer 13 can be set to be longer than the length of the gap layer 12 or the length of the lower pole layer 11, and thus it is possible to increase the volume of the upper pole layer 13 without increasing the area of the gap layer 12.

Consequently, it is possible to prevent the flux flowing from the upper core layer 15 from being excessively concentrated at the joint, and the amount of flux flowing through the upper pole layer 13 can be appropriately adjusted.

Figure 6:
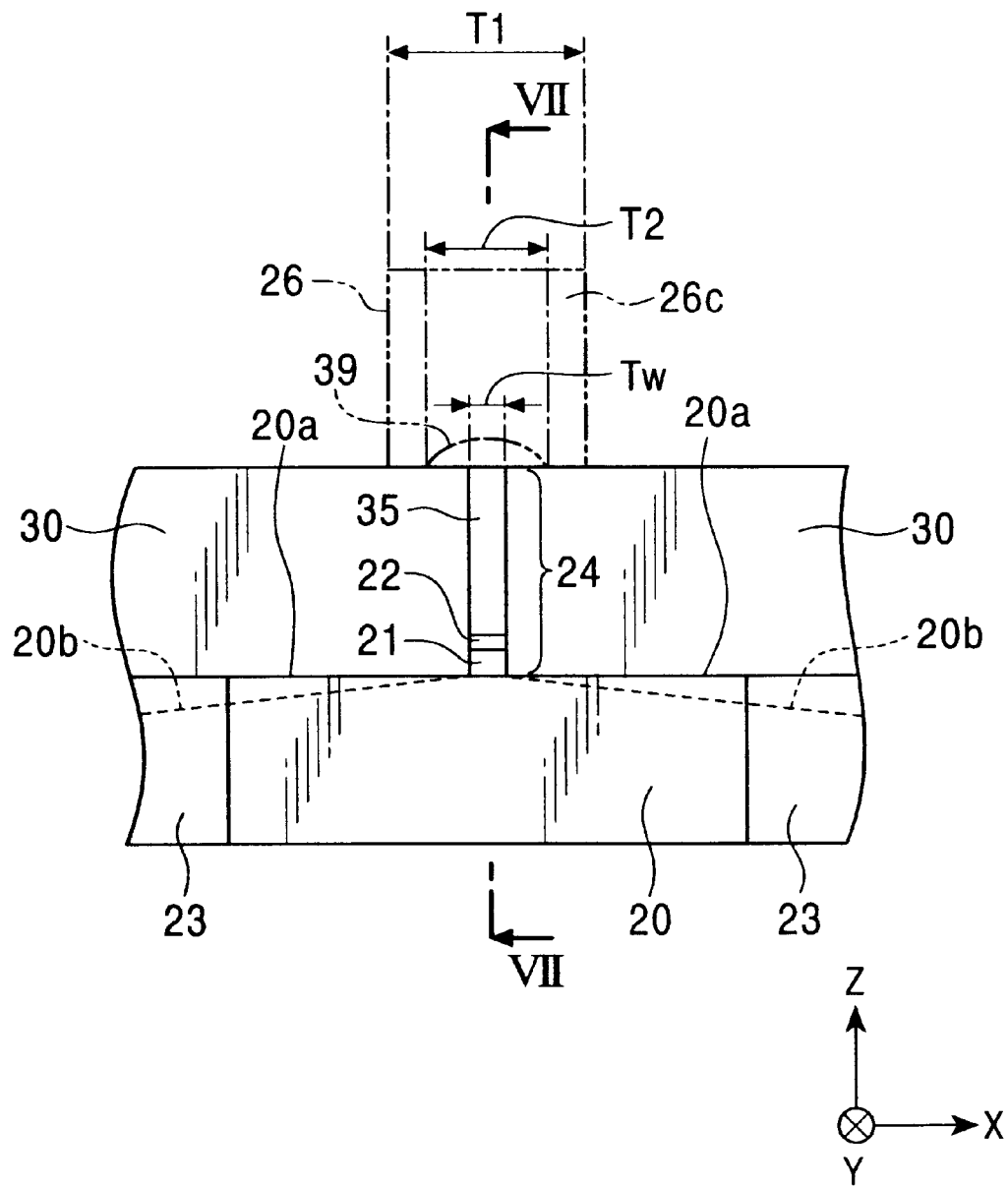
FIG. 6 is a partial front view of a thin-film magnetic head in a fifth embodiment of the present invention.
Figure 7:
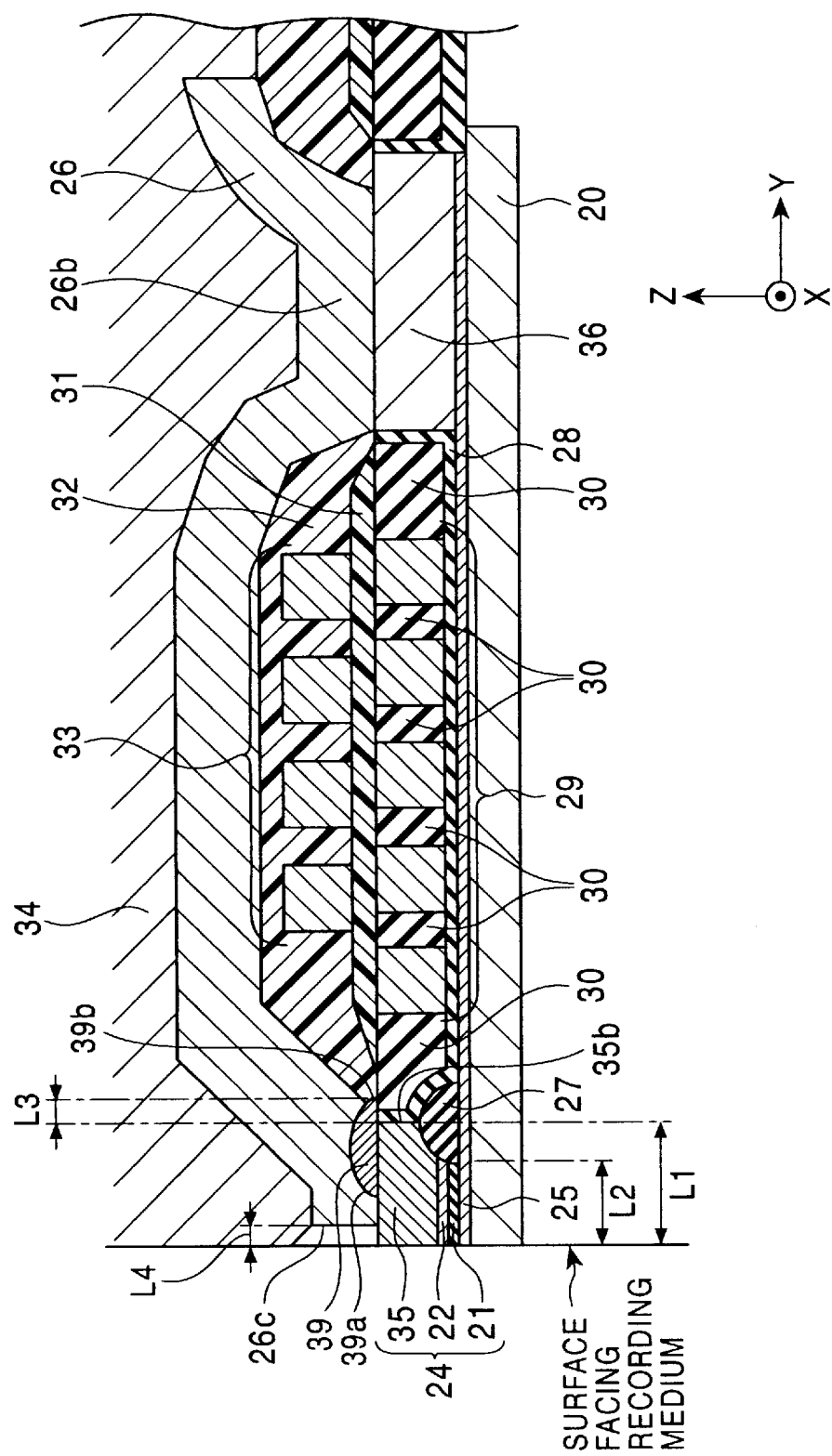
FIG. 7 is a partial sectional view taken along the line VII—VII of FIG. 6.

FIG. 6 is a partial front view of a thin-film magnetic head in a fifth embodiment of the present invention, and FIG. 7 is a partial sectional view taken along the line VII—VII of FIG. 6.

The thin-film magnetic head shown in FIG. 6 is an inductive head for writing. In the present invention, a read head (MR head) using a magnetoresistive effect may be deposited on the lower surface of the inductive head.

A lower core layer 20 shown in FIGS. 6 and 7 is composed of a magnetic material, such as Permalloy. Additionally, when a read head is deposited on the lower surface of the lower core layer 20, a shielding layer for protecting a magnetoresistive element from noise may be provided independently. Alternatively, without providing the shielding layer, the lower core layer 20 may be also used as an upper shielding layer of the read head.

As shown in FIG. 6, insulating layers 23 are formed on both sides of the lower core layer 20. An upper surface 20a extending from the base of a lower pole layer 21, which will be described below, may be parallel to the track width direction (the X direction in the drawing), or inclined planes 20b which incline toward a direction opposite to an upper core layer 26 may be formed. By forming the inclined planes 20b in the upper surface of the lower core layer 20, side fringing can be suppressed more appropriately.

As shown in FIGS. 6 and 7, a recording core 24 is formed on the lower core layer 20 so as to be exposed at a surface facing a recording medium. In this embodiment, the recording core 24 is formed with a track width Tw, i.e., the recording core 24 is a track-width-defining section. The track width Tw is preferably 0.7 $\mu$m or less, and more preferably 0.5 $\mu$m or less.

In the embodiment shown in FIGS. 6 and 7, the recording core 24 has a layered structure including three layers of the lower pole layer 21, a gap layer 22, and an upper pole layer 35. The pole layers 21 and 35 and the gap layer 22 will be described below.

The lower pole layer 21, which is the lowest layer of the recording core 24, is formed by plating on the lower core layer 20. The lower pole layer 21 is magnetically coupled to the lower core layer 20, and the material for the lower pole layer 21 may be the same as or different from that for the lower core layer 20. The lower pole layer 21 may be composed of either a single-layered film or a multi-layered film. The height of the lower pole layer 21 is set, for example, at approximately 0.3 $\mu$m.

As shown in FIGS. 6 and 7, the gap layer 22, which is nonmagnetic, is deposited on the lower pole layer 21.

In the present invention, preferably, the gap layer 22 is composed of a nonmagnetic metallic material and is formed by plating on the lower pole layer 21. The nonmagnetic metallic material is preferably at least one material selected from the group consisting of NiP, NiPd, NiW, NiMo, NiRh, Au, Pt, Rh, Pd, Ru, and Cr, and the gap layer 22 may be composed of either a single-layered film or a multi-layered film. The height of the gap layer 22 is set, for example, at approximately 0.2 $\mu$m.

The upper pole layer 35 which is magnetically coupled to the upper core layer 26 is formed by plating on the gap layer 22. The material for the upper pole layer 35 may be the same as or be different from that for the upper core layer 26. The upper pole layer 35 may be composed of either a single-layered film or a multi-layered film. The height of the upper pole layer 35 is set, for example, at approximately 2.4 to 2.7 $\mu$m.

When the gap layer 22 is composed of the nonmagnetic metallic material as described above, it is possible to form the lower pole layer 21, the gap layer 22, and the upper pole layer 35 continuously by plating.

Additionally, in the present invention, the recording core 24 is not limited to the layered structure including three layers. The recording core 24 may have a layered structure including two layers of the gap layer 22 and the upper pole layer 35.

As described above, the materials for the lower pole layer 21 and the upper pole layer 35 constituting the recording core 24 may be the same as or different from those for the core layers to which the pole layers are magnetically coupled, respectively. In order to improve the recording density, the lower pole layer 21 and the upper pole layer 35 which are opposed to each other with the gap layer 22 therebetween preferably have higher saturation flux densities than those of the core layers to which the pole layers are magnetically coupled, respectively. If the lower pole layer 21 and the upper pole layer 35 have high saturation flux densities, it is possible to concentrate the recording magnetic field in the vicinity of the gap, thus improving the recording density.

As shown in FIG. 7, a plating underlayer 25 is formed between the lower pole layer 21 and the lower core layer 20.

As shown in FIG. 7, the recording core 24 is formed with a length L1 from the surface facing the recording medium (ABS) in the height direction (in the Y direction in the drawing).

A Gd-setting insulating layer 27 composed of a resist or the like is formed on the lower core layer 20, and the Gd-setting insulating layer 27 has, for example, a curved surface. As shown in FIG. 7, the upper pole layer 35 extends over the curved surface.

As shown in FIG. 7, the length L2 from the front surface of the Gd-setting insulating layer 27 to the surface facing the recording medium is defined as a gap depth Gd, and since the gap depth Gd greatly influences the electrical characteristics of the thin-film magnetic head, the gap depth Gd is set at a predetermined length.

In the embodiment shown in FIG. 7, the gap depth Gd is defined by the position of the Gd-setting insulating layer 27 formed on the lower core layer 20.

As shown in FIG. 7, a coil layer 29 is spirally formed on the lower core layer 20 at the back, in the height direction (in the Y direction in the drawing), of the recording core 24 with an underlying insulating layer 28 therebetween. The underlying insulating layer 28 is preferably composed of at least one insulating material selected from the group consisting of Al$_O$, Al$_2$O$_3$, SiO$_2$, Ta$_2$O$_5$, TiO, AlN, AlSiN, TiN, SiN, Si$_3$N$_4$, NiO, WO, WO$_3$, BN, CrN, and SiON.

The spaces between individual conducting sections of the coil layer 29 are filled by an insulating layer 30. The insulating layer 30 is preferably composed of at least one insulating material selected from the group consisting of A1O, Al$_2$O$_3$, SiO$_2$, Ta$_2$O$_5$, TiO, AlN, AlSiN, TiN, SiN, Si$_3$N$_4$, NiO, WO, WO$_3$, BN, CrN, and SiON.

As shown in FIG. 6, the insulating layer 30 is formed so as to sandwich both sides in the track width direction (in the X direction) of the recording core 24, and the insulating layer 30 is exposed at the surface facing the recording medium.

As shown in FIG. 7, an insulating layer 31 composed of an organic insulating material, such as a resist or a polyimide, is formed on the insulating layer 30, and a second coil layer 33 is spirally formed on the insulating layer 31.

The second coil layer 33 is covered by an insulating layer 32 composed of an organic material, such as a resist or a polyimide, and the upper core layer 26 composed of an NiFe alloy or the like is formed by patterning, for example, using a frame plating method, on the insulating layer 32.

As shown in FIG. 7, a base 26b of the upper core layer 26 is magnetically coupled to an elevating layer 36 composed of a magnetic material, such as an NiFe alloy, which is formed on the lower core layer 20. Additionally, the elevating layer 36 may not be provided, and in such a case, the base 26b of the upper core layer 26 is directly connected to the lower core layer 20.

In the thin-film magnetic head shown in FIG. 7, although two coil layers are deposited, the coil may be single-layered. In such a case, for example, the space at the back in the height direction of the recording core 24 on the lower core layer 20 is filled by the insulating layer 30, and the coil layer is formed on the insulating layer 30. Alternatively, the second coil layer 33 shown in FIG. 7 is not formed and the upper core layer 26 is formed over the insulating layer 31. The upper core layer 26 is covered by a protective layer 34 composed of an insulating material, such as $Al_2O_3$.

In this embodiment, as shown in FIG. 7, a magnetic intermediate layer 39 is formed between the upper pole layer 35 and the upper core layer 26.

The magnetic intermediate layer 39 has a higher saturation flux density than that of the upper core layer 26.

In this embodiment, a front surface 39a at the recording medium side of the magnetic intermediate layer 39 is located towards the back, in the height direction (in the Y direction), from the surface facing the recording medium. A surface opposite to the front surface 39a of the magnetic intermediate layer 39, i.e., a back surface 39b, extends from a back surface 35b of the upper pole layer 35 by an extension length L3. Preferably, the extension length L3 is 1 μm or less. If the extension length L3 is increased, the recording magnetic field flowing from the upper core layer 26 through the magnetic intermediate layer 39 into the upper pole layer 35 is decreased, resulting in a decrease in recording efficiency.

In the embodiment shown in FIG. 7, a front surface 26c of the upper core layer 26 at the recording medium side extends from the front surface 39a of the magnetic intermediate layer 39 in a direction opposite to the height direction (opposite to the Y direction), and the upper core layer 26 is magnetically coupled to the upper pole layer 35 and the magnetic intermediate layer 39.

As shown in FIG. 6, the width T1 in the track width direction of the front surface 26c of the upper core layer 26 is larger than the width T2 in the track width direction of the magnetic intermediate layer 39.

Consequently, as shown in FIG. 7, the magnetic intermediate layer 39, excluding a portion of the back surface 39b, is entirely covered by the upper core layer 26.

As described above, the magnetic intermediate layer 39 has a higher saturation flux density than that of the upper core layer 26. Specifically, the magnetic intermediate layer 39 preferably has a saturation flux density of 1.3 T (tesla) or more. In order to obtain such a saturation flux density, the magnetic intermediate layer 39 is preferably composed of FeNi, where the Fe content is 40 to 90% by mass, and the balance is the Ni content.

As described above, the magnetic intermediate layer 39, which has a higher saturation flux density than that of the upper core layer 26, is interposed between the upper pole layer 35 and the upper core layer 26.

Consequently, since the recording magnetic field from the upper core layer 26 flows into the upper pole layer 35 after being concentrated at the magnetic intermediate layer 39 having the high saturation flux density, the width of a fringing magnetic field occurring between the upper core layer 26 and the upper pole layer 35 is not substantially larger than the track width Tw, in contrast to the conventional thin-film magnetic head.

That is, in accordance with the present invention, the fringing magnetic field can be appropriately concentrated in the vicinity of the gap, and it is possible to effectively suppress side fringing in comparison with the conventional thin-film magnetic head.

Additionally, since the recording magnetic field from the upper core layer 26 flows into the upper pole layer 35 after being concentrated at the magnetic intermediate layer 39, effective flow of the magnetic field into the upper pole layer 35 is facilitated, thus improving recording efficiency in comparison with the conventional thin-film magnetic head.

In the thin-film magnetic head shown in FIGS. 6 and 7, as described above, since the width T2 in the track width direction of the magnetic intermediate layer 39 is smaller than the width T1 in the track width direction of the upper core layer 26, the fringing magnetic field occurring between the magnetic intermediate layer 39 and the upper magnetic layer 35 does not easily exceed the track width Tw, and thus it is possible to effectively suppress side fringing in comparison with the conventional thin-film magnetic head.

Furthermore, as shown in FIGS. 6 and 7, the front surface 26c at the recording medium side of the upper core layer 26 recedes from the surface facing the recording medium in the height direction (in the Y direction). In this way, side fringing can be more effectively suppressed.

Additionally, the shortest distance L4 between the front surface 26c and the surface facing the recording medium is preferably L1 or less. Specifically, the shortest distance L4 preferably satisfies the relationship $0 < L4 \leq 0.8$ μm.

If the shortest distance L4 exceeds 0.8 μm, recording efficiency decreases due to a decrease in the contact area between the upper core layer 26, and the magnetic intermediate layer 39 and the upper pole layer 35.

Preferably, the saturation flux density of the magnetic intermediate layer 39 is equal to or higher than the saturation flux density of the upper pole layer 35. Therefore, for example, the magnetic intermediate layer 39 and the upper pole layer 35 are composed of the same material.

When the saturation flux density of the magnetic intermediate layer 39 is equal to or higher than the saturation flux density of the upper pole layer 35, side fringing can be more appropriately suppressed and also the recording magnetic field easily passes from the upper core layer 26 through the magnetic intermediate layer 39 into the upper pole layer 35 appropriately, thus improving the recording efficiency.

Although the magnetic intermediate layer 39 has a curved surface in the embodiment shown in FIGS. 6 and 7, the present invention is not limited thereto. For example, the magnetic intermediate layer 39 may have a rectangular shape.

Figure 8:
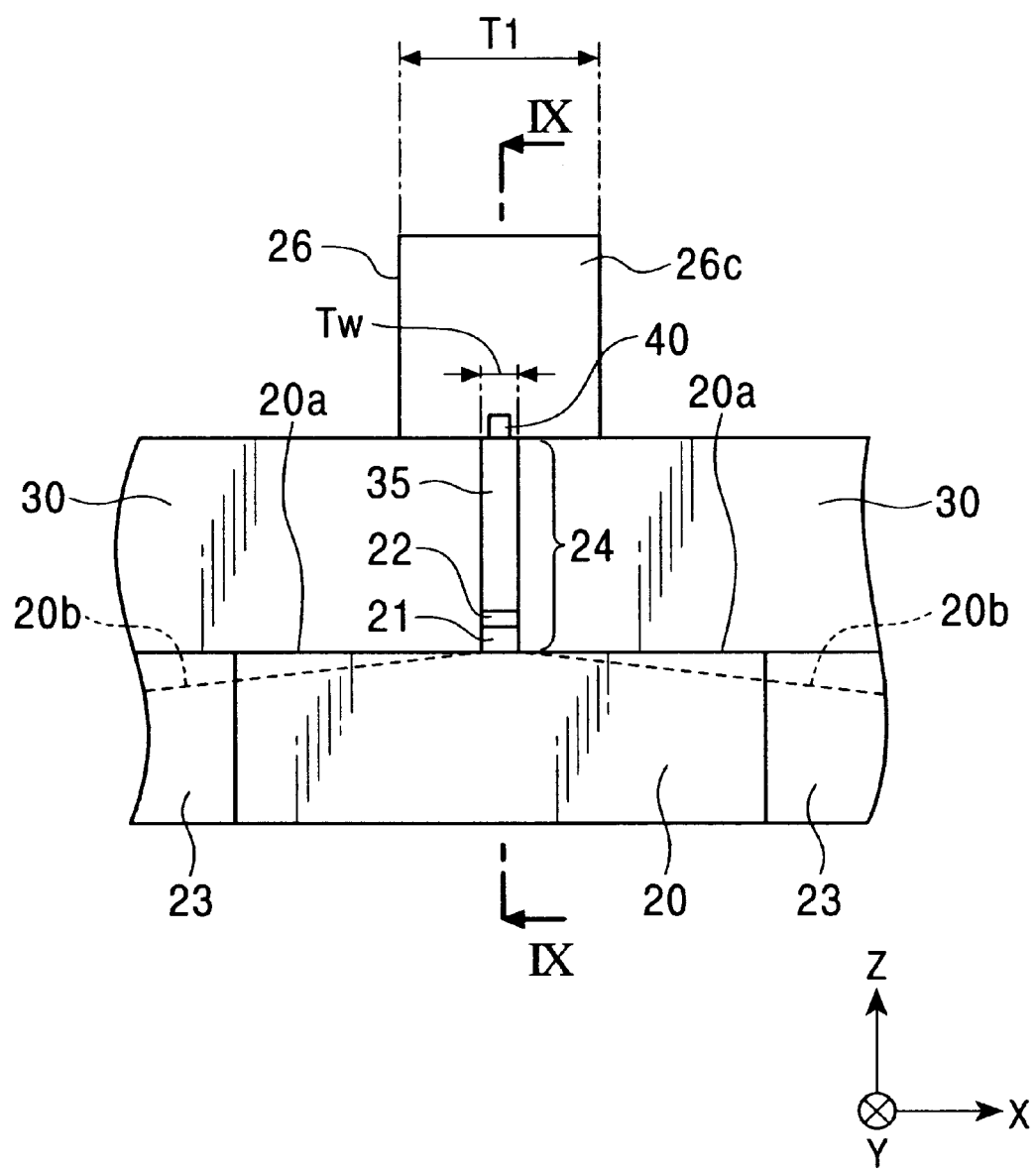
FIG. 8 is a partial front view of a thin-film magnetic head in a sixth embodiment of the present invention.
Figure 9:
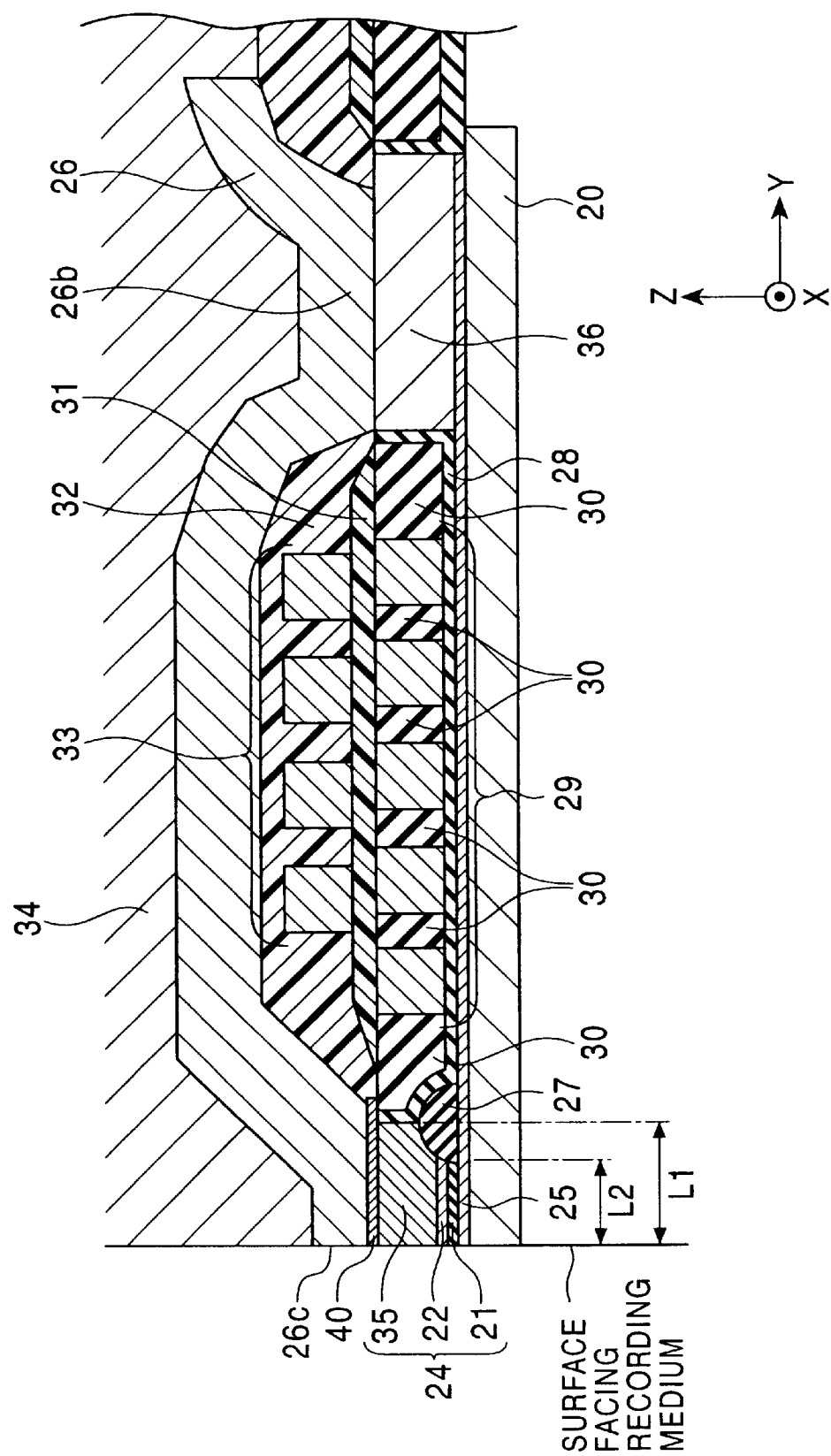
FIG. 9 is a partial sectional view taken along the line IX—IX of FIG. 8.

FIG. 8 is a partial front view of a thin-film magnetic head in a sixth embodiment of the present invention, and FIG. 9 is a partial sectional view taken along the line IX—IX of FIG. 8.

The thin-film magnetic head in this embodiment has the same structure as that of the thin-film magnetic head shown in FIGS. 6 and 7 apart from the fact that the shapes and the positions of a magnetic intermediate layer and an upper core layer are different.

As shown in FIG. 8, a magnetic intermediate layer 40 formed between an upper core layer 26 and an upper pole layer 35 has a width in the track width direction (in the X direction) that is smaller than the width in the track width direction (i.e., track width Tw) of the upper pole layer 35.

In such a case, the magnetic intermediate layer 40 may be exposed at the surface facing a recording medium as shown in FIGS. 8 and 9.

When a recording magnetic field from the upper core layer 26 is concentrated at the magnetic intermediate layer 40 having a higher saturation flux density than that of the upper core layer 26, since the recording magnetic field flows from the magnetic intermediate layer 40 into the upper pole layer 35 which has a larger width than that of the magnetic intermediate layer 40, even if the magnetic intermediate layer 40 is exposed at the surface facing the recording medium, a fringing magnetic field does not occur wider than the track width, and it is possible to concentrate the fringing magnetic field in the vicinity of the gap, thus appropriately suppressing side fringing.

However, the front surface at the recording medium side of the magnetic intermediate layer 40 may recede from the surface facing the recording medium in the height direction.

Additionally, the material for the magnetic intermediate layer 40, and the saturation flux density relationship between the magnetic intermediate layer 40 and the upper pole layer 35 are the same as those described with reference to FIGS. 6 and 7.

Figure 10:
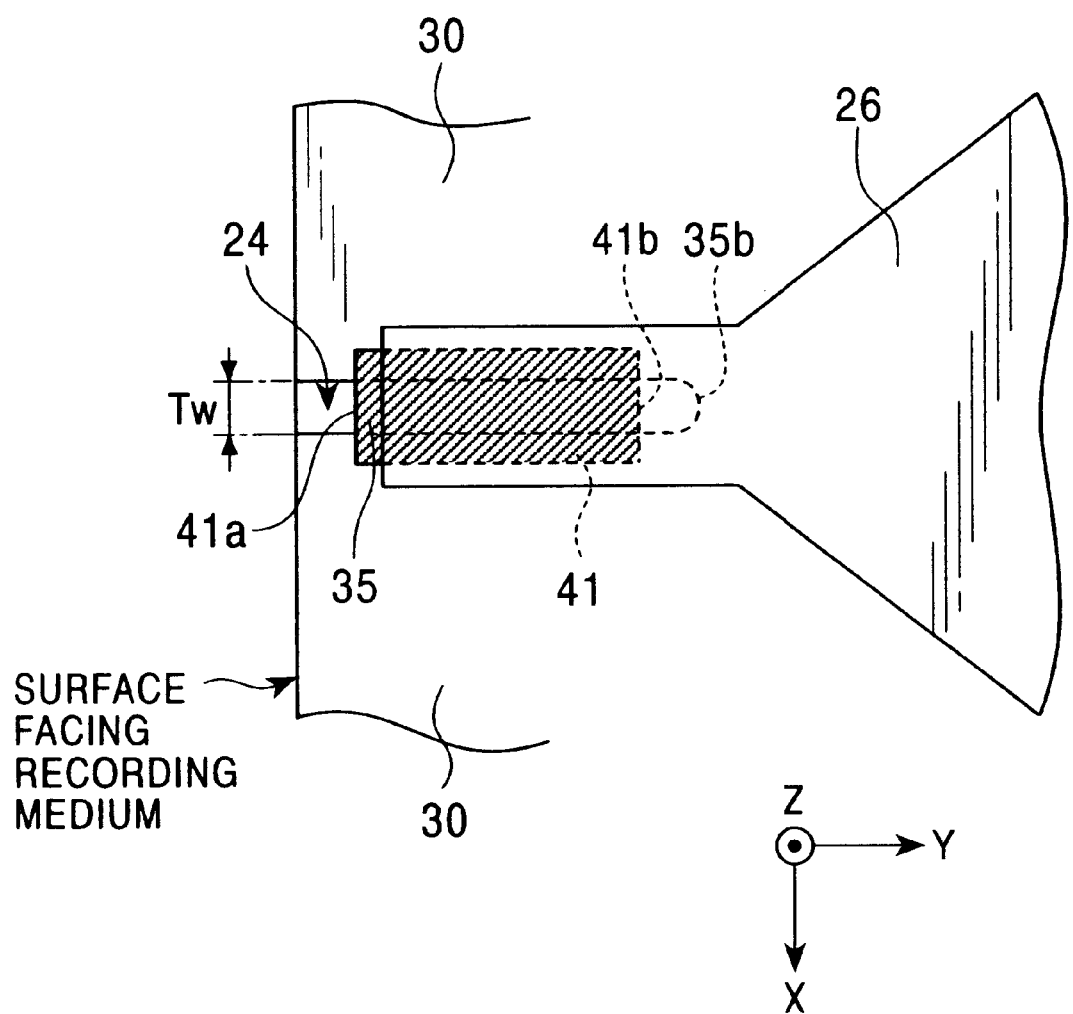
FIG. 10 is a partial plan view of a thin-film magnetic head in a seventh embodiment of the present invention.
Figure 11:
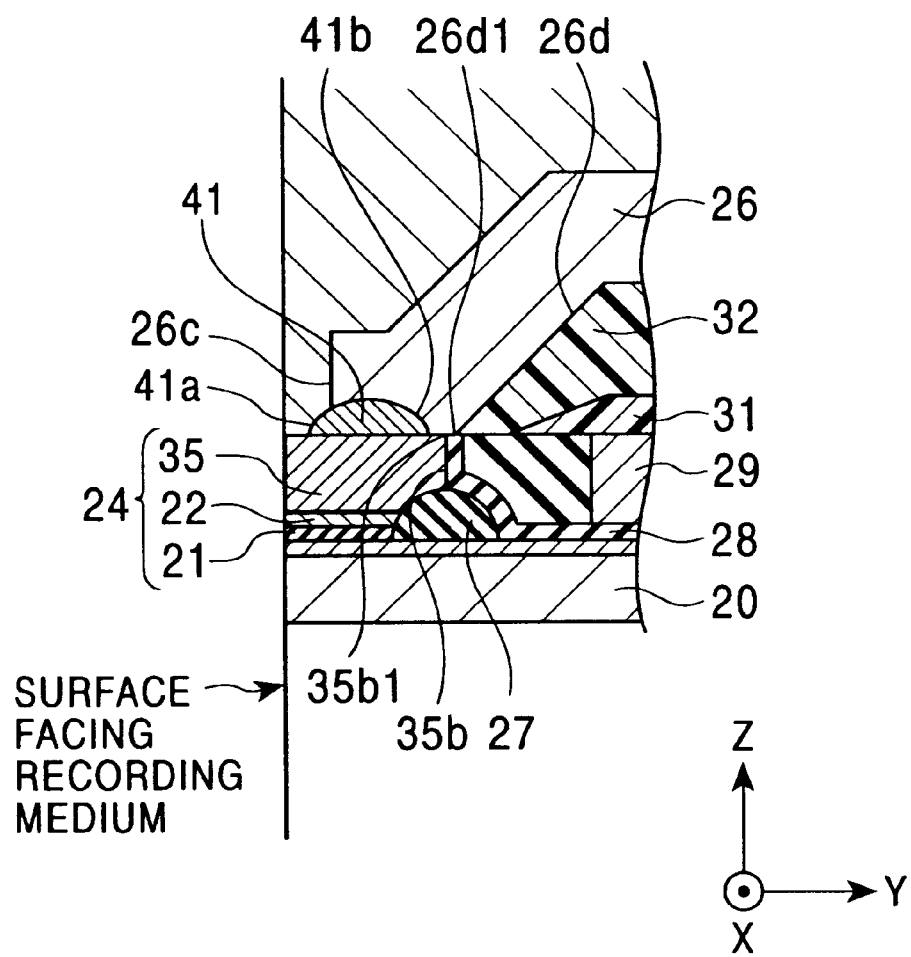
FIG. 11 is a partial longitudinal sectional view of the thin-film magnetic head shown in FIG. 10.

FIG. 10 is a partial plan view of a thin-film magnetic head in a seventh embodiment of the present invention, and FIG. 11 is a partial longitudinal sectional view of the thin-film magnetic head shown in FIG. 10 in the vicinity of the tip.

In this embodiment, as shown in FIGS. 10 and 11, the width in the track width direction (in the X direction) of a magnetic intermediate layer 41 is smaller than the width in the track width direction of an upper core layer 26, and the width of the magnetic intermediate layer 41 is larger than the width in the track width direction of an upper pole layer 35.

A front surface 41a at the recording medium side of the magnetic intermediate layer 41 extends from a front surface 26c at the recording medium side of the upper core layer 26 in a direction opposite to the height direction (in a direction opposite to the Y direction), and the front surface 41a is exposed from the upper core layer 26.

Additionally, even if a portion of the front surface 41a of the magnetic intermediate layer 41 is not entirely covered by the upper core layer 26 and is exposed, suppression of side fringing and recording efficiency are not adversely affected.

In this embodiment, as shown in FIGS. 10 and 11, a back surface 41b, which is a surface opposite to the front surface 41a of the magnetic intermediate layer 41, is located forward from a back surface 35b of the upper pole layer 35 in a direction opposite to the height direction (in a direction opposite to the Y direction).

As shown in FIG. 11, a lower end 26d1 of a back surface 26d, which is a surface opposite to the front surface 26c of the upper core layer 26, is set at a position slightly deviated in the Y direction from an upper end 35b1 of the back surface 35b of the upper pole layer 35.

Preferably, the deviation of the lower end 26d1 of the back surface 26d from the upper end 35b1 of the back surface 35b of the upper pole layer 35 is approximately 1 µm.

The position of the lower end 26d1 of the back surface 26d and the position of the upper end 35b1 of the back surface 35 of the upper pole layer 35 may coincide with each other.

However, it is not preferable that the lower end 26d1 of the back surface 26d be located forward from the upper end 35b1 of the back surface 35b of the upper pole layer 35 in a direction opposite to the height direction (in a direction opposite to the Y direction). In such a case, the contact area between the upper core layer 26 and the upper pole layer 35 becomes insufficient, resulting in a decrease in recording efficiency.

In the embodiment shown in FIGS. 10 and 11, a recording magnetic field from the upper core layer 26 is also concentrated at the magnetic intermediate layer 41 having a higher saturation flux density than that of the upper core layer 26, and the recording magnetic field then flows into the upper pole layer 35. Therefore, a fringing magnetic field does not easily occur wider than the track width Tw, and it is possible to concentrate the fringing magnetic field in the vicinity of the gap, thus appropriately suppressing side fringing.

Since the recording magnetic field is concentrated at the magnetic intermediate layer 41 and then flows into the upper pole layer 35, recording efficiency is satisfactory, and it is possible to provide a thin-film magnetic head which is suitable for an increased recording density.

Additionally, the material for the magnetic intermediate layer 41, and the saturation flux density relationship between the magnetic intermediate layer 41 and the upper pole layer 35 are the same as those described with reference to FIGS. 6 and 7.

Figure 12:
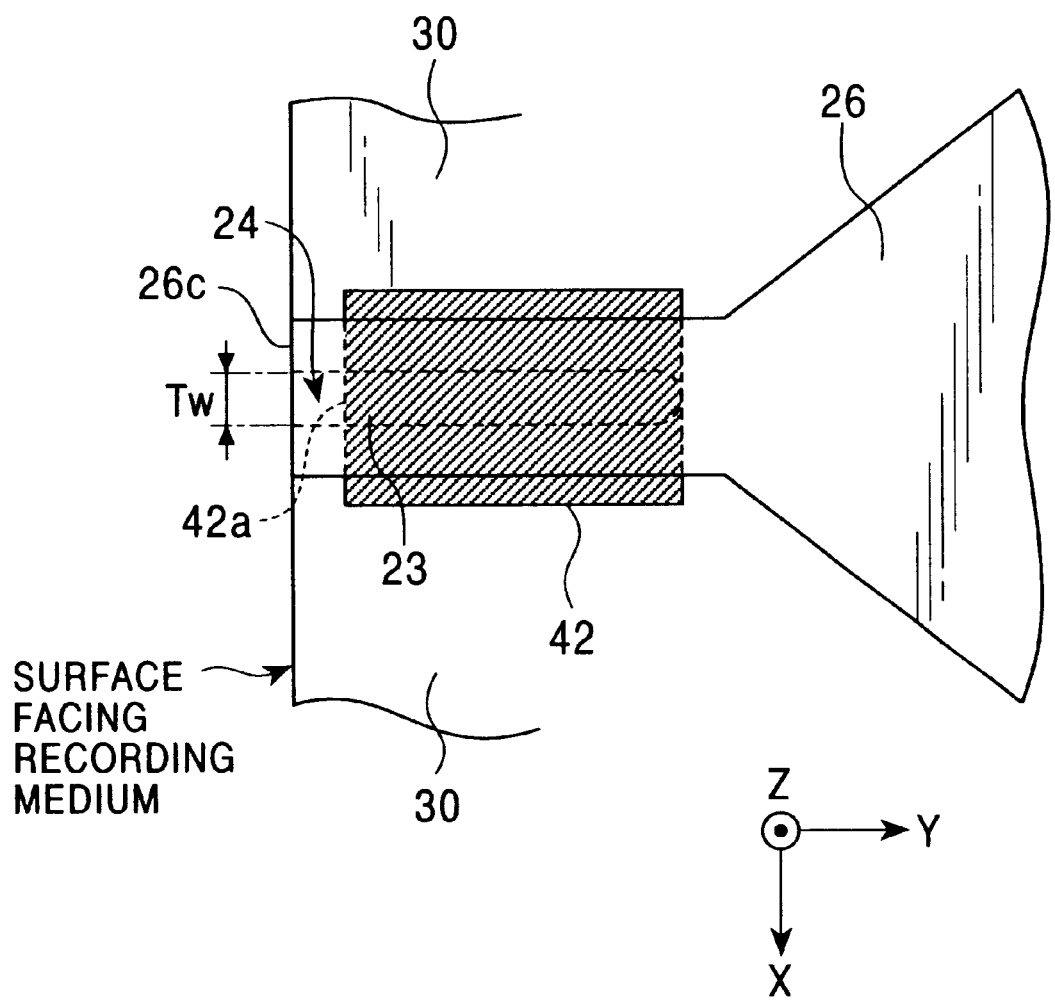
FIG. 12 is a partial plan view of a thin-film magnetic head in an eighth embodiment of the present invention.

FIG. 12 is a partial plan view of a thin-film magnetic head in an eighth embodiment of the present invention. As shown in FIG. 12, the width in the track width direction (in the X direction) of a magnetic intermediate layer 42 is larger than the width in the track width direction of an upper core layer 26, and both edges in the track width direction of the magnetic intermediate layer 42 are exposed from the upper core layer 26.

In this embodiment, although the capability of suppressing side fringing is considered to be inferior to that in the embodiments shown in FIGS. 7 to 11, for example, by providing a structure in which a front surface 42a at the recording medium side of the magnetic intermediate layer 42 recedes from the surface facing the recording medium in the height direction (in the Y direction) as shown in FIG. 12, suppression of side fringing can be improved, and thus it is possible to provide a thin-film magnetic head in which side fringing can be reduced in comparison with the conventional thin-film magnetic head.

Although the front surface 26c at the recording medium side of the upper core layer 26 is exposed at the surface facing the recording medium in this embodiment, preferably the front surface 26c recedes from the surface facing the recording medium in the height direction in view of further suppression of side fringing.

Next, a method for fabricating a thin-film magnetic head in the present invention will be described with reference to FIGS. 13 to 17.

Figure 13:
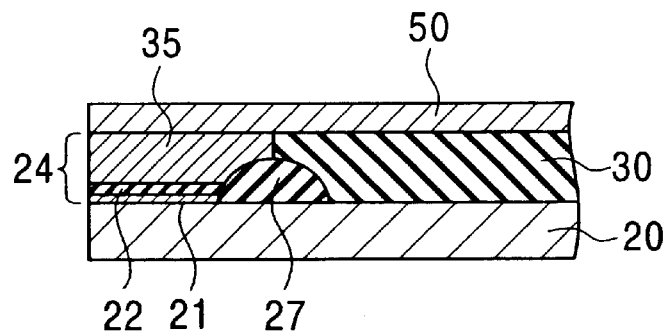
FIG. 13 is a partial sectional view showing a step in a method for fabricating a thin-film magnetic head of the present invention.

In the step shown in FIG. 13, a recording core 24 comprising three layers of a lower pole layer 21, a gap layer 22, and an upper pole layer 35 is continuously formed by plating on a lower core layer 20.

In order to perform such continuous plating, the gap layer 22 must be composed of a nonmagnetic metallic material formable by plating. Specifically, the nonmagnetic metallic material is preferably at least one material selected from the group consisting of NiP, NiPd, NiW, NiMo, Au, Pt, Rh, Pd, Ru, and Cr.

Additionally, the recording core 24 is not limited to the three-layered film as described above. For example, the recording core 24 may be composed of the gap layer 22 and the upper pole layer 35.

Prior to the formation of the recording core 24, a Gd-setting insulating layer 27 is formed on the lower core layer 20. The length from the front surface of the Gd-setting insulating layer 27 to the surface facing a recording medium determines a gap depth (Gd).

Either one of the two methods described below may be used to form the recording core 24 on the lower core layer 20. In a first method, an insulating layer 30 is formed on the lower core layer 20, and a trench is formed in the insulating layer 30 at a predetermined length from the surface facing the recording medium in the height direction, and then the recording core 24 is formed in the trench by continuous plating.

In a second method, a resist layer is formed on the lower core layer 20, and a trench which is similar to that described above is formed in the resist layer by exposure and development, and then the recording core 24 is formed in the trench by continuous plating. After the resist layer is removed, the lower core layer 20 is covered by the insulating layer 30, and polishing is performed by a CMP technique so that the upper surface of the recording core 24 and the upper surface of the insulating layer 30 are level with each other.

Next, as shown in FIG. 13, a magnetic material layer 50 is formed on the recording core 24 and the insulating layer 30. The magnetic material layer 50 must have a larger saturation flux density than that of an upper core layer 26 formed in the subsequent step. In the present invention, the saturation flux density of the magnetic material layer 50 is preferably 1.3 T or more, and the magnetic material layer 50 is composed of, for example, FeNi, where the Fe content is 40 to 90% by mass and the balance is the Ni content.

Figure 14:
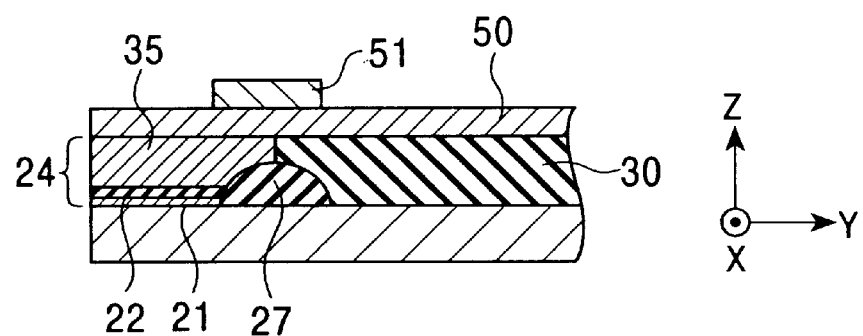
FIG. 14 is a partial sectional view showing a step carried out subsequent to the step shown in FIG. 13.

Next, as shown in FIG. 14, a resist layer 51 with a predetermined size is formed on the magnetic material layer 50 so as to cover at least a portion of the magnetic material layer 50 formed on the recording core 24.

For example, the width in the track width direction of the resist layer 51 is set to be larger than the width in the track width direction of the recording core 24. Additionally, at this stage, the width of the resist layer 51 is preferably smaller than the width in the track width direction of the upper core layer 26 which is formed in the subsequent step.

The width of the resist layer 51 may be smaller than the width of the recording core 24.

Figure 15:
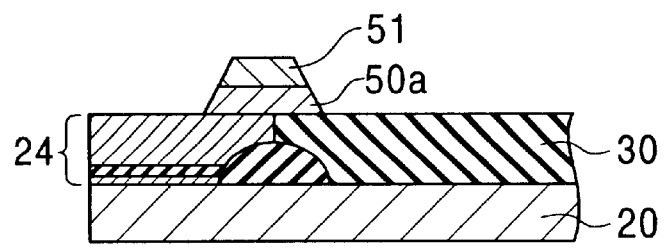
FIG. 15 is a partial sectional view showing a step carried out subsequent to the step shown in FIG. 14.
Figure 16:
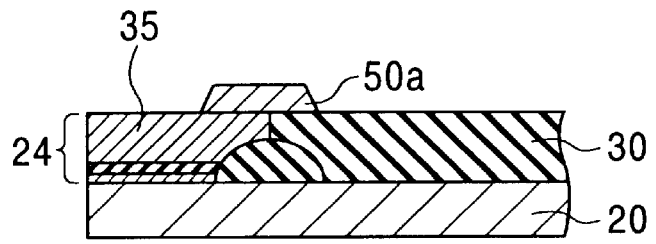
FIG. 16 is a partial sectional view showing a step carried out subsequent to the step shown in FIG. 15.

Next, as shown in FIG. 15, the magnetic material layer 50 which is not covered by the resist layer 51 is removed, for example, by etching. Thereby, a magnetic material layer 50a remains beneath the resist layer 51. The remaining magnetic material layer 50a corresponds to a magnetic intermediate layer.

Next, an insulating layer 31, a coil layer 33, and an insulating layer 32 are formed on the insulating layer 30 at the back, in the height direction (in the Y direction in the drawing), of the magnetic intermediate layer 50a, and then the upper core layer 26 composed of a magnetic material is formed by patterning over the upper pole layer 35, the magnetic intermediate layer 50a, and the insulating layer 32 using a frame plating method.

Figure 17:
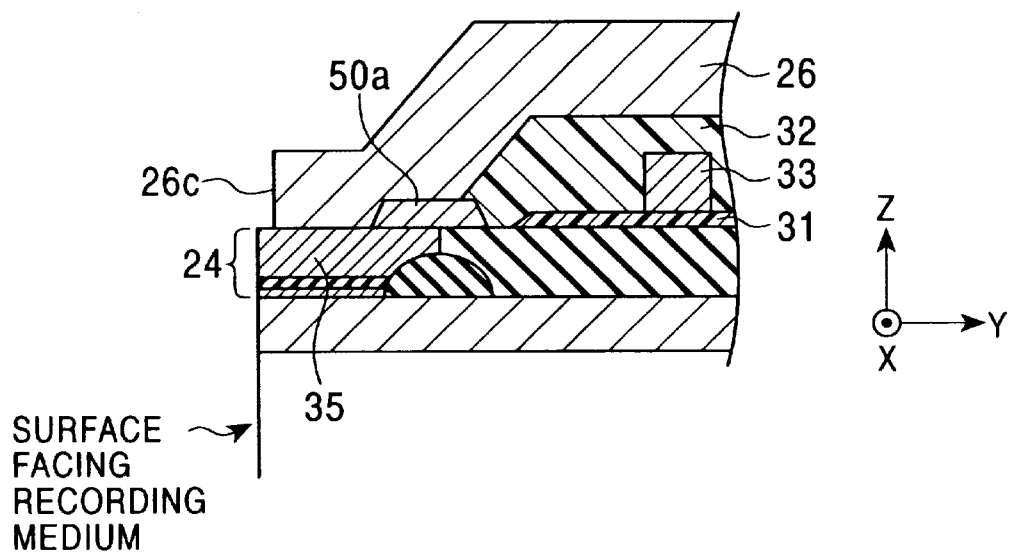
FIG. 17 is a partial sectional view showing a step carried out subsequent to the step shown in FIG. 16.

In this embodiment, as shown in FIG. 17, a front surface 26c at the recording medium side of the upper core layer 26 recedes from the surface facing the recording medium in the height direction (in the Y direction). However, the front surface 26c may be formed along the surface facing the recording medium so as to be exposed at the surface facing the recording medium.

FIGS. 18 to 22 shows another method for fabricating a thin-film magnetic head in the present invention.

Figure 18:
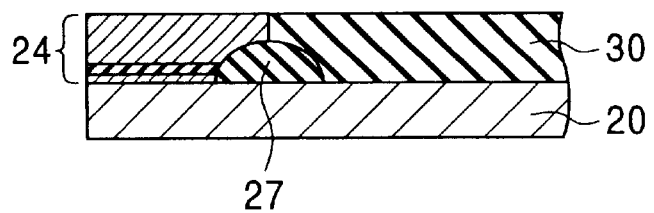
FIG. 18 is a partial sectional view showing a step in another method for fabricating a thin-film magnetic head of the present invention.

In the step shown in FIG. 18, a Gd-setting insulating layer 27, a recording core 24, and an insulating layer 30 are formed on a lower core layer 20. The structure and the formation method of the recording core 24 are the same as those described with reference to FIG. 13.

Next, a plating underlayer composed of an NiFe alloy or the like, which is necessary for forming a magnetic intermediate layer 53 in the subsequent step, is formed over the recording core 24 and the insulating layer 30, and then a resist layer 52 is formed on the plating underlayer.

Figure 19:
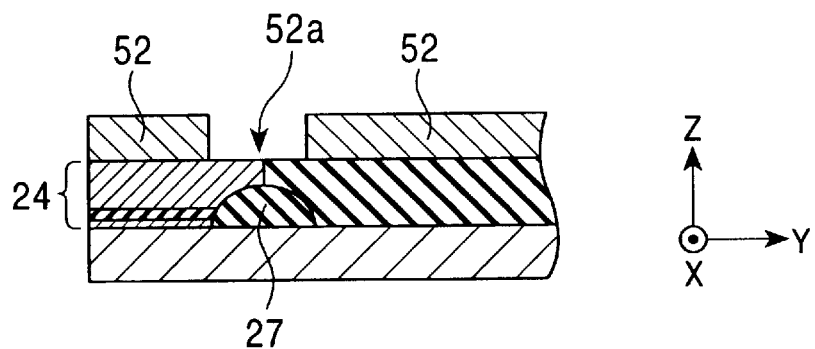
FIG. 19 is a partial sectional view showing a step carried out subsequent to the step shown in FIG. 18.

Next, as shown in FIG. 19, a pattern 52a for forming a magnetic intermediate layer is made in the resist layer 52. The pattern 52a is formed by exposure and development. When the pattern 52a is formed, at least a portion of the recording core 24 is exposed in the pattern 52a.

The width in the track width direction (in the X direction) of the pattern 52a is larger than the width in the track width direction of the recording core 24. Preferably, the width of the pattern 52a is smaller than the width in the track width direction of an upper core layer 26 formed in the subsequent step.

The width of the pattern 52a may be smaller than the width (track width Tw) of the recording core 24.

Figure 20:
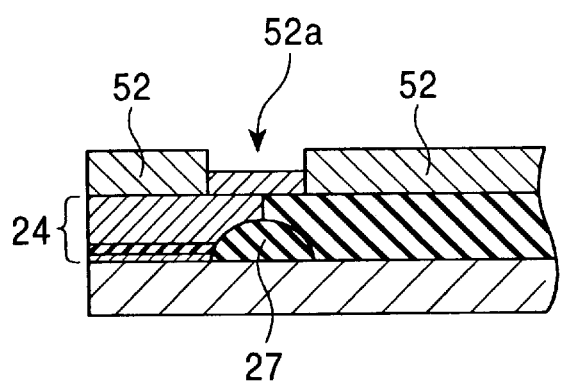
FIG. 20 is a partial sectional view showing a step carried out subsequent to the step shown in FIG. 19.

Next, as shown in FIG. 20, a magnetic material layer is formed in the pattern 52a. The magnetic material layer corresponds to a magnetic intermediate layer 53. Additionally, the saturation flux density of the magnetic intermediate layer 53 must be greater than the saturation flux density of the upper core layer 26 formed in the subsequent step. Preferably, the magnetic intermediate layer 53 has a saturation flux density of 1.3 T or more, and for example, the magnetic intermediate layer 53 is composed of FeNi, where the Fe content is 40 to 90% by mass and the balance is the Ni content.

Figure 21:
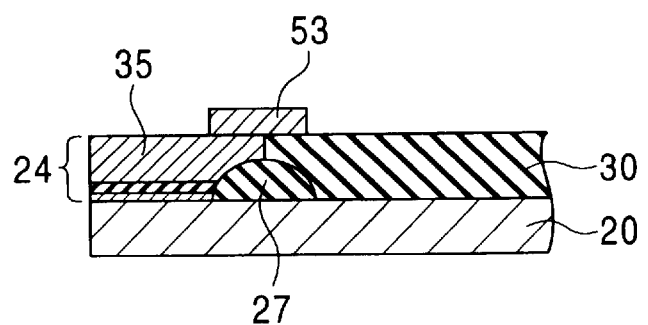
FIG. 21 is a partial sectional view showing a step carried out subsequent to the step shown in FIG. 20.

The resist layer 52 is then removed (refer to FIG. 21). By removing the resist layer 52, the upper pole layer 35, the magnetic intermediate layer 53, and the insulating layer 30 are exposed. Additionally, after the resist layer 52 is removed, the plating underlayer formed over the upper pole layer 35 and the insulating layer 30 is removed.

Figure 22:
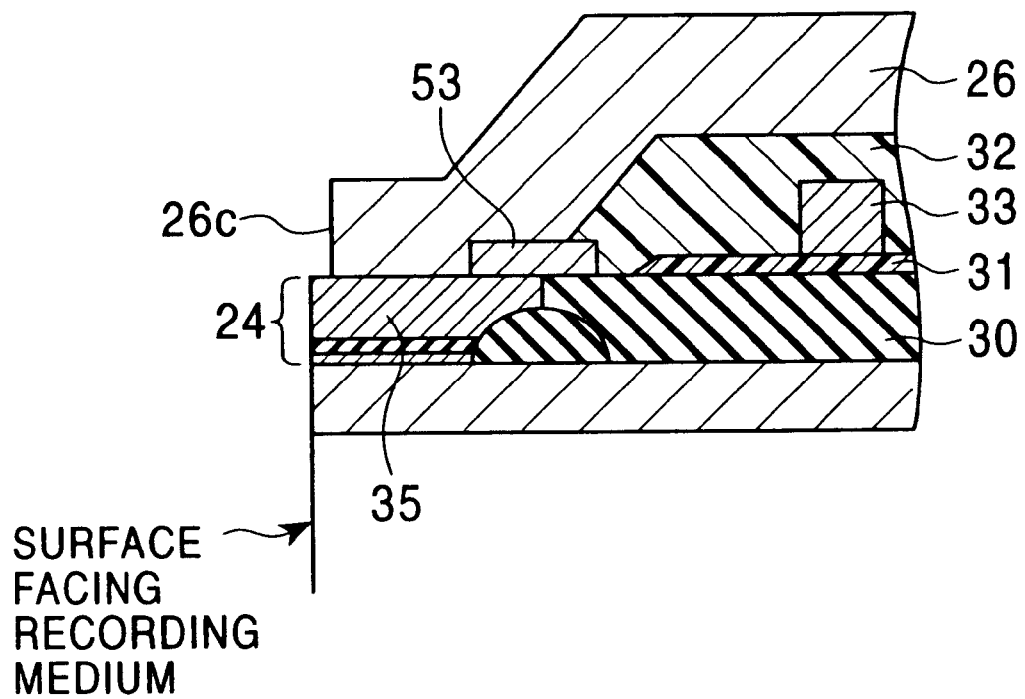
FIG. 22 is a partial sectional view showing a step carried out subsequent to the step shown in FIG. 21.
Figure 23:
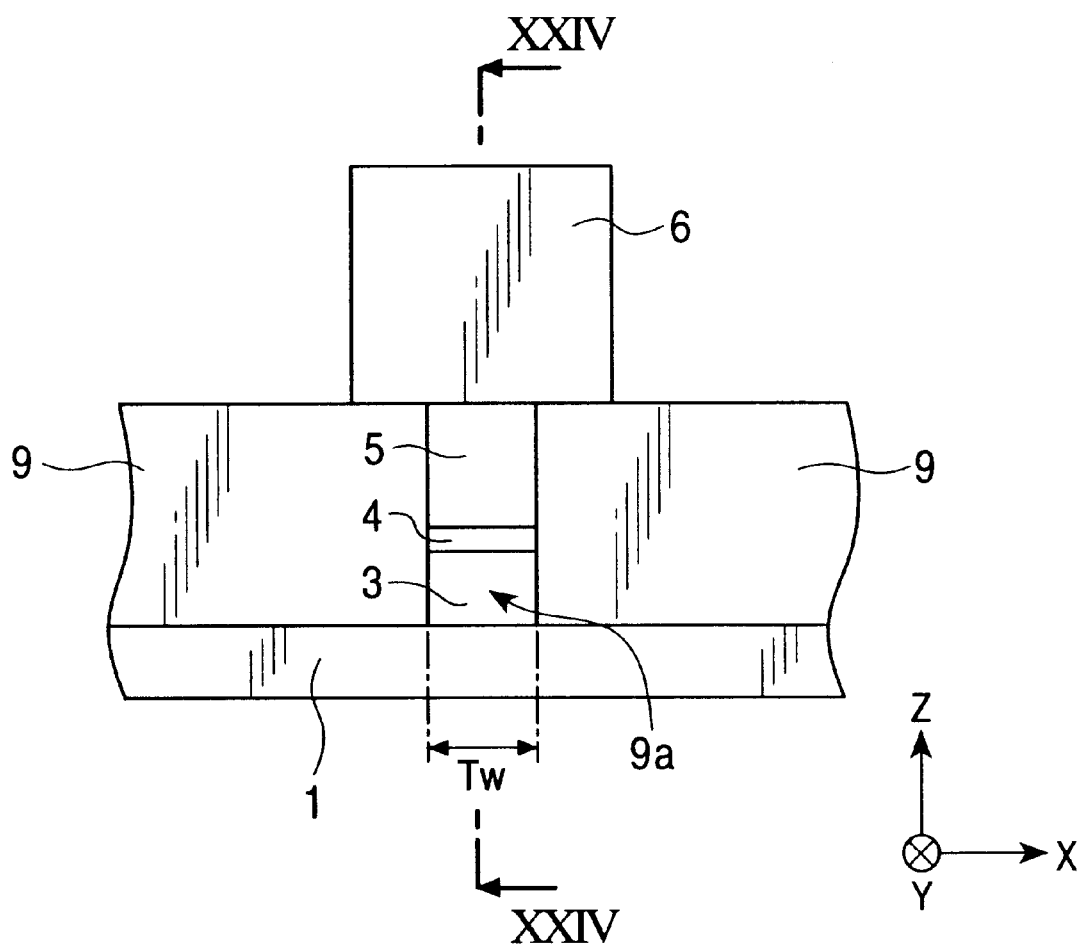
FIG. 23 is a partial front view of a conventional thin-film magnetic head.
Figure 24:
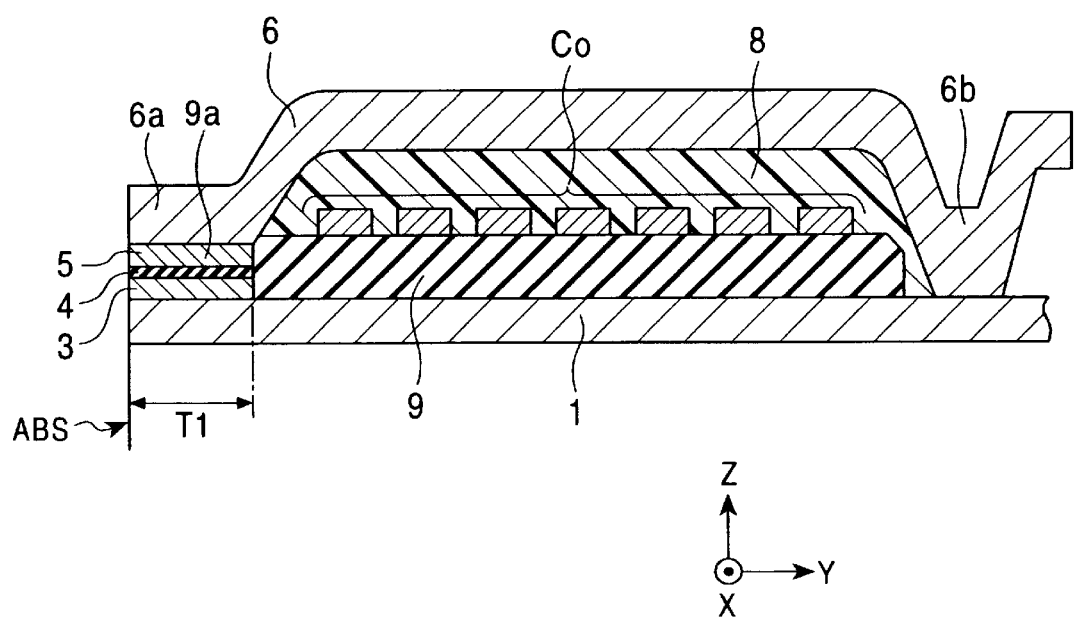
FIG. 24 is a partial sectional view taken along the line XXIV—XXIV of FIG. 23.

Next, as shown in FIG. 22, an insulating layer 31, a coil layer 33, and an insulating layer 32 are formed on the insulating layer 30 at the back, in the height direction (in the Y direction), of the magnetic intermediate layer 53.

The upper core layer 26 composed of a magnetic material is then formed by patterning using a frame plating method over the upper pole layer 35, the magnetic intermediate layer 53, and the insulating layer 32.

As shown in FIG. 22, a front surface 26c at the recording medium side of the upper core layer 26 recedes from the surface facing the recording medium in the height direction (in the Y direction). However, the front surface 26c of the upper core layer 26 may be formed along the surface facing the recording medium so as to be exposed at the surface facing the recording medium.

Additionally, each of the magnetic intermediate layers 50a and 53 formed in the steps shown in FIGS. 13 to 17 and in FIGS. 18 to 22, respectively, recedes from the surface facing the recording medium in the height direction.

The reason for this is that in the step shown in FIG. 14, the resist layer 51 is formed so as to recede from the surface facing the recording medium in the height direction, and in the step shown in FIG. 19, the pattern 52a is formed so as to recede from the surface facing the recording medium in the height direction.

However, when the width in the track width direction of each of the magnetic intermediate layers 50a and 53 is smaller than the width in the track width direction of the recording core 24, the front surface of each of the magnetic intermediate layers 50a and 53 may be exposed at the surface facing the recording medium.

In such cases, in the step shown in FIG. 14, the front surface of the resist layer 51 is formed along the surface facing the recording medium, and in the step shown in FIG. 19, the front surface of the pattern 52a is formed along the surface facing the recording medium. Thereby, the front surface at the recording medium side of each of the magnetic intermediate layer 50a and 53 is exposed at the surface facing the recording medium.

In each method for fabricating the thin-film magnetic in the present invention described above, the magnetic intermediate layer 50a or 53 can be easily formed between the upper pole layer 35 and the upper core layer 26 with a high degree of consistency. Due to the formation of the magnetic intermediate layer 50a or 53, a fringing magnetic field can be concentrated in the vicinity of the gap, and thus it is possible to obtain a thin-film magnetic head in which side fringing can be effectively suppressed.

In accordance with the fabrication method of the present invention, due to the formation of the magnetic intermediate layer 50a or 53, satisfactory magnetic coupling can be obtained between the upper core layer 26 and the upper pole layer 35.

What is claimed is:

1. A thin-film magnetic head comprising:
    a lower core layer;
    a gap layer formed on the lower core layer directly or with a lower pole layer therebetween, the lower pole layer having a smaller width in the track width direction than that of the lower core layer;
    an upper pole layer formed on the gap layer, the upper pole layer having a smaller width in the track width direction than that of the lower core layer; and
    an upper core layer joined to the upper pole layer,
    wherein, in the joint between the upper pole layer and the upper core layer, the width in the track width direction of the lower surface of the upper core layer is larger than the width in the track width direction of the upper surface of the upper pole layer, and the inner end of the lower surface of the upper core layer is located at the back, in the height direction, of the inner end of the upper surface of the upper pole layer,
    wherein the back surface of the upper pole layer is located towards the back, in the height direction, from the depth in the height direction of a magnetic gap, the magnetic gap being formed by joining the upper pole layer and the gap layer together.

2. A thin-film magnetic head according to claim 1, wherein the inner end of the lower surface of the upper core layer is 0.2 μm to 1.5 μm distant from the inner end of the upper surface of the upper pole layer in the height direction.

3. A thin-film magnetic head according to claim 1, wherein a Gd-setting insulating layer for determining the depth in the height direction of the magnetic gap is provided towards the back, in the height direction, and the contact surface between the upper pole layer and the Gd-setting insulating layer is located at the back, in the height direction, of the magnetic gap.

4. A thin-film magnetic head according to claim 1, wherein the gap layer comprises a nonmagnetic metallic material formable by plating.

5. A thin-film magnetic head according to claim 4, wherein the nonmagnetic metallic material is at least one material selected from the group consisting of NiP, NiPd, NiW, NiMo, Au, Pt, Rh, Pd, Ru, and Cr.

6. A thin-film magnetic head comprising:
    a lower core layer;
    a recording core formed on the lower core layer and exposed at a surface facing a recording medium, the recording core comprising either a lower pole layer, a gap layer, and an upper pole layer deposited in that order, or the gap layer and the upper pole layer deposited in that order;
    an upper core layer magnetically coupled to the upper pole layer of the recording core;
    a coil for inducing a recording magnetic field in the lower core layer, the recording core, and the upper core layer; and
    a magnetic intermediate layer formed between the upper pole layer and the upper core layer, the magnetic intermediate layer having a higher saturation flux density than that of the upper core layer,
    wherein the width in the track width direction of the magnetic intermediate layer is smaller than the width in the track width direction of the upper core layer, and
    wherein the width of the magnetic intermediate layer in the track width direction corresponds to the width of the tip of the thin-film magnetic head at the surface facing the recording medium.

7. A thin-film magnetic head according to claim 6, wherein the width in the track width direction of the magnetic intermediate layer is smaller than the width in the track width direction of the upper pole layer.

8. A thin-film magnetic head according to claim 7, wherein the front surface at the recording medium side of the magnetic intermediate layer is exposed at the surface facing the recording medium.

9. A thin-film magnetic head according to claim 6, wherein the front surface at the recording medium side of the magnetic intermediate layer recedes in the height direction from the surface facing the recording medium.

10. A thin-film magnetic head according to claim 6, wherein the front surface at the recording medium side of the upper core layer recedes in the height direction from the surface facing the recording medium.

11. A thin-film magnetic head according to claim 6, wherein the saturation flux density of the magnetic intermediate layer is 1.3 T or more.

12. A thin-film magnetic head according to claim 11, wherein the magnetic intermediate layer comprises FeNi, where the Fe content is 40 to 90% by mass and the balance is the Ni content.

13. A method for fabricating a thin-film magnetic head comprising:
    a step (a) of forming a recording core on a lower core layer, the recording core comprising either a lower pole layer, a gap layer, and an upper pole layer deposited in that order, wherein the layers define the widths in the track width direction of the lower pole layer and the upper pole layer, at a surface facing a recording medium; or a gap layer and an upper pole layer deposited in that order, wherein the layers define the width in the track width direction of the upper pole layer at a surface facing a recording medium;

a step (b) of forming an insulating layer in the periphery of the recording core prior to or subsequent to the step (a) so that the upper surface of the recording core and the upper surface of the insulating layer are at the same level;

a step (c) of forming a magnetic material layer having a higher saturation flux density than that of an upper core layer on the recording core and the insulating layer;

a step (d) of forming a resist layer with a predetermined size on the magnetic material layer so as to cover at least a portion of the magnetic material layer formed on the recording core;

a step (e) of removing the magnetic material layer in the portion not covered by the resist layer so as to form a magnetic intermediate layer from the remaining magnetic material layer; and a step (f) of removing the resist layer on the magnetic intermediate layer and forming the upper core layer on the magnetic intermediate layer by patterning.

14. A method for fabricating a thin-film magnetic head according to claim 13, wherein, in the step (d), the width in the track width direction of the resist layer is smaller than the width in the track width direction of the upper core layer so that the width in the track width direction of the magnetic intermediate layer is smaller than the width in the track width direction of the upper core layer.

15. A method for fabricating a thin-film magnetic head according to claim 14, wherein, in the step (d), the width in the track width direction of the resist layer is smaller than the width in the track width direction of the upper pole layer so that the width in the track width direction of the magnetic intermediate layer is smaller than the width in the track width direction of the upper pole layer.

16. A method for fabricating a thin-film magnetic head according to claim 15, wherein, in the step (d), the front surface at the recording medium side of the resist layer is formed along the surface facing the recording medium so that the front surface at the recording medium side of the magnetic intermediate layer is exposed at the surface facing the recording medium.

17. A method for fabricating a thin-film magnetic head according to claim 13, wherein, in the step (d), the front surface at the recording medium side of the resist layer recedes in the height direction from the surface facing the recording medium so that the front surface at the recording medium side of the magnetic intermediate layer recedes in the height direction from the surface facing the recording medium.

18. A method for fabricating a thin-film magnetic head according to claim 13, wherein, in the step (f), the front surface at the recording medium side of the upper core layer recedes in the height direction from the surface facing the recording medium.

19. A method for fabricating a thin-film magnetic head according to claim 13, wherein the magnetic intermediate layer comprises FeNi, where the Fe content is 40 to 90% by mass and the balance is the Ni content.

20. A method for fabricating a thin-film magnetic head comprising:

a step (a) of forming a recording core on a lower core layer, the recording core comprising either a lower pole layer, a gap layer, and an upper pole layer deposited in that order, wherein the layers define the widths in the track width direction of the lower pole layer and the upper pole layer, at a surface facing a recording medium; or a gap layer and an upper pole layer deposited in that order, wherein the layers define the width in the track width direction of the upper pole layer at a surface facing a recording medium;

a step (b) of forming an insulating layer in the periphery of the recording core prior to or subsequent to the step (a) so that the upper surface of the recording core and the upper surface of the insulating layer are at the same level;

a step (g) of forming a resist layer on the recording core and the insulating layer, and making a pattern for forming a magnetic intermediate layer in the resist layer so that at least a portion of the recording core is exposed in the pattern;

a step (h) of forming the magnetic intermediate layer in the pattern, the magnetic intermediate layer having a larger saturation flux density than that of an upper core layer;

a step (i) of removing the resist layer; and a step (j) of forming the upper core layer on the magnetic intermediate layer by patterning.

21. A method for fabricating a thin-film magnetic head according to claim 20, wherein, in the step (g), the width in the track width direction of the pattern is smaller than the width in the track width direction of the upper core layer so that the width in the track width direction of the magnetic intermediate layer is smaller than the width in the track width direction of the upper core layer.

22. A method for fabricating a thin-film magnetic head according to claim 21, wherein, in the step (g), the width in the track width direction of the pattern is smaller than the width in the track width direction of the upper pole layer so that the width in the track width direction of the magnetic intermediate layer is smaller than the width in the track width direction of the upper pole layer.

23. A method for fabricating a thin-film magnetic head according to claim 22, wherein, in the step (g), the front surface at the recording medium side of the pattern is formed along the surface facing the recording medium so that the front surface at the recording medium side of the magnetic intermediate layer is exposed at the surface facing the recording medium.

24. A method for fabricating a thin-film magnetic head according to claim 23, wherein, in the step (g), the front surface at the recording medium side of the pattern recedes in the height direction from the surface facing the recording medium so that the front surface at the recording medium side of the magnetic intermediate layer recedes in the height direction from the surface facing the recording medium.

25. A method for fabricating a thin-film magnetic head according to claim 20, wherein, in the step (j), the front surface at the recording medium side of the upper core layer recedes in the height direction from the surface facing the recording medium.

26. A method for fabricating a thin-film magnetic head according to claim 20, wherein the magnetic intermediate layer comprises FeNi, where the Fe content is 40 to 90% by mass and the balance is the Ni content.

* * * * *